(12) United States Patent
Zhang

(10) Patent No.: US 11,461,129 B2
(45) Date of Patent: Oct. 4, 2022

(54) DATA PROCESSING METHOD, TERMINAL AND STORAGE MEDIUM

(71) Applicant: ZTE CORPORATION, Guangdong (CN)

(72) Inventor: Guanghua Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/044,440

(22) PCT Filed: Feb. 28, 2019

(86) PCT No.: PCT/CN2019/076493
§ 371 (c)(1),
(2) Date: Oct. 1, 2020

(87) PCT Pub. No.: WO2019/196567
PCT Pub. Date: Oct. 17, 2019

(65) Prior Publication Data
US 2021/0096907 A1 Apr. 1, 2021

(30) Foreign Application Priority Data
Apr. 8, 2018 (CN) .......................... 201810306565.0

(51) Int. Cl.
*G06F 9/48* (2006.01)
*G06F 3/0486* (2013.01)
(Continued)

(52) U.S. Cl.
CPC .......... *G06F 9/4843* (2013.01); *G06F 3/0486* (2013.01); *G06F 3/04817* (2013.01);
(Continued)

(58) Field of Classification Search
CPC .... G06F 9/4843; G06F 3/0486; G06F 3/0482; G06F 3/4842; G06F 3/04817;
(Continued)

(56) References Cited

U.S. PATENT DOCUMENTS 5,801,699 A * 9/1998 Hocker ............... G06F 3/04817
715/837
8,266,550 B1 * 9/2012 Cleron ............... G06F 3/04845
715/863
(Continued)

FOREIGN PATENT DOCUMENTS

CN 105335216 A 2/2016
CN 105487743 A 4/2016
(Continued)

OTHER PUBLICATIONS

WIPO, International Search Report dated May 27, 2019.
(Continued)

*Primary Examiner* — Andrew L Tank
(74) *Attorney, Agent, or Firm* — Li & Cai Intellectual Property (USA) Office

(57) ABSTRACT

A data processing method, comprising: receiving a task management function instruction; calling a task management interface according to the task management function instruction, wherein the task management interface includes a task object area comprised of a chain of task objects and a function area; determining a task object to be processed in the task object area; implementing functional processing on the task object to be processed through function area. Further a terminal and a storage medium are also disclosed.

14 Claims, 20 Drawing Sheets

(51) Int. Cl.
*G06F 3/04817* (2022.01)
*G06F 3/04886* (2022.01)
*G06F 3/0482* (2013.01)
*H04M 1/72472* (2021.01)

(52) U.S. Cl.
CPC .... *G06F 3/04886* (2013.01); *H04M 1/72472* (2021.01); *G06F 3/0482* (2013.01)

(58) Field of Classification Search
CPC ......... G06F 2203/04803; G06F 3/0485; G06F 3/04883; G06F 3/04842; H04M 1/72472; H04M 1/72469
See application file for complete search history.

(56) References Cited

U.S. PATENT DOCUMENTS

| | | | | |
|---|---|---|---|---|
| 8,607,157 | B2* | 12/2013 | Shibata | G06F 3/0481 715/803 |
| 8,769,431 | B1* | 7/2014 | Prasad | G06F 3/048 715/788 |
| 8,799,816 | B2* | 8/2014 | Wells | G06F 3/0482 715/830 |
| 9,104,705 | B2* | 8/2015 | Fujinaga | G06F 16/54 |
| 9,207,717 | B2* | 12/2015 | Sirpal | G06F 1/1616 |
| 9,411,503 | B2* | 8/2016 | Ikeda | G06F 3/04883 |
| 9,753,607 | B2* | 9/2017 | Nakazato | G06F 1/1694 |
| 10,102,824 | B2* | 10/2018 | Khoury | G06F 3/0481 |
| 10,261,672 | B1* | 4/2019 | Dolbakian | G06F 3/04817 |
| 2004/0100479 | A1* | 5/2004 | Nakano | G06F 3/0485 715/700 |
| 2008/0207188 | A1* | 8/2008 | Ahn | G06F 3/04847 455/418 |
| 2009/0247112 | A1* | 10/2009 | Lundy | G06F 3/0486 455/404.1 |
| 2009/0259959 | A1* | 10/2009 | Grotjohn | G06F 3/0486 715/769 |
| 2010/0017732 | A1* | 1/2010 | Matsushima | G06F 3/0482 715/765 |
| 2010/0299638 | A1* | 11/2010 | Choi | G06F 3/0488 715/835 |
| 2011/0087981 | A1* | 4/2011 | Jeong | G06F 3/04883 715/765 |
| 2012/0075194 | A1* | 3/2012 | Ferren | G06K 9/00248 345/168 |
| 2012/0216146 | A1* | 8/2012 | Korkonen | G06F 3/0482 715/835 |
| 2013/0014006 | A1* | 1/2013 | Abellera | G06F 3/0482 715/234 |
| 2013/0072263 | A1* | 3/2013 | Kim | G06F 3/04886 455/566 |
| 2013/0086522 | A1* | 4/2013 | Shimazu | G06F 3/0488 715/810 |
| 2014/0173517 | A1* | 6/2014 | Chaudhri | G06F 3/0485 715/830 |
| 2014/0229888 | A1* | 8/2014 | Ko | G06F 3/04842 715/783 |
| 2014/0351724 | A1* | 11/2014 | Kim | G06F 3/04883 715/765 |
| 2015/0234581 | A1* | 8/2015 | Terrero | G06F 3/04886 715/863 |
| 2017/0041455 | A1* | 2/2017 | Hong | G06F 3/04842 |
| 2017/0185248 | A1* | 6/2017 | Lee | G06F 3/0482 |
| 2018/0329605 | A1* | 11/2018 | Venkateswararao | G06F 3/0482 |

FOREIGN PATENT DOCUMENTS

| | | |
|---|---|---|
| CN | 105786473 A | 7/2016 |
| CN | 105975201 A | 9/2016 |
| WO | WO2016165284 A | 10/2016 |

OTHER PUBLICATIONS

China Patent Office, First Office Action dated Sep. 15, 2021, for corresponding Chinese application No. 201810306565.0.

European Patent Office, Extended European Search Report dated Dec. 8, 2021, for corresponding EP application No. 19784853.4.

* cited by examiner

DATA PROCESSING METHOD, TERMINAL AND STORAGE MEDIUM

The present disclosure claims priority to Chinese patent disclosure No. 201810306565.0, entitled "DATA PROCESSING METHOD, TERMINAL AND STORAGE MEDIUM" filed on Apr. 8, 2018 in the China National Intellectual Property Administration, the entirety of which is incorporated herein by reference.

FIELD OF THE DISCLOSURE

The present disclosure relates to the field of display technique in the field of electronic technologies, and in particular to a data processing method, a terminal and a storage medium.

BACKGROUND

With rapid development of electronic technologies, there are more and more types of terminal application functions which can be implemented by application programs. Various application programs are independent with each other and are called as tasks after running.

Users often encounter some situations for example where there is a need to switch back to a previous task from the current task or find a task that is required to be switched to in a previous task, or encounter task management work such as deleting a previous task. In the process of using a terminal, a recent task management function is used to implement the management of recent tasks. Here, a main screen is long-pressed to call a graphical interface of recent task management, the recent tasks are listed on the graphical interface, a task icon that needs to be switched is found from the recent tasks, and a position of the task icon is clicked to switch or other task management works need to be performed. At present, the graphical interface for task management includes two presentation modes: fold mode and unfold mode. No matter which mode is selected, when there are a lot of applications (i.e., tasks), it is time-consuming and cumbersome to locate one of the applications and operate it. This is mainly because the number of diagrams corresponding to the applications presented on the current interface is relatively less. It is necessary to select the diagrams corresponding to the required applications from a large number of diagrams through operations, and then perform the corresponding task management work, which results in the increased complexity of the recent task management work and the lower efficiency.

SUMMARY

In view of this, the main objectives of the present disclosure is to provide a data processing method, a terminal and a storage medium, so as to simplify the task management process and improve work efficiency.

In order to achieve the above objectives, the technical schemes of the present disclosure are carried out as follows:

In the embodiment of the present disclosure, there is provided a data processing method, including: receiving a task management function instruction; calling a task management interface according to the task management function instruction, wherein the task management interface includes a task object area comprised of a chain of task objects and a function area; determining a task object to be processed in the task object area; and performing functional processing on the task object to be processed through the function area.

In the above scheme, the task management interface further includes: a representation area; after the task object to be processed is determined in the task object area, the method further includes: displaying a first representation corresponding to the task object to be processed through the representation area.

In the above scheme, the step of determining the task object to be processed in the task object area includes: determining the task object to be processed from the chain of task objects currently displayed in the task object area.

In the above scheme, the step of determining the task object to be processed in the task object area includes: receiving a movement instruction for the chain of task objects; updating the chain of task objects currently displayed according to the movement instruction; and determining the task object to be processed from the updated chain of task object.

In the above scheme, the step of determining the task object to be processed in the task object area includes: receiving a selection instruction for the chain of task objects in the task object area; and selecting at least one task object from the chain of task objects as the task object to be processed according to the selection instruction.

In the above scheme, the step of performing functional processing on the task object to be processed through the function area includes: receiving a first drag instruction for the task object to be processed in the function area; dragging the task object to be processed to a first function area in the function area according to the first drag instruction; and performing the functional processing on the task object to be processed according to a function type corresponding to the first function area.

In the above scheme, the step of performing the functional processing on the task object to be processed through the function area includes: receiving a second drag instruction for the task object to be processed in the function area; and when the task object to be processed is dragged in a first direction by a preset threshold according to the second drag instruction, performing functional processing on the task object to be processed according to the function type corresponding to the first direction.

In the above scheme, before the step of receiving the task management function instruction, the method further includes: setting the task object area.

In the above scheme, the step of setting the task object area includes: dividing a current display area into N areas on basis of two-dimensional coordinates, wherein N is an integer greater than or equal to 2; receiving a connection instruction for the N areas; connecting consecutive M areas in the N areas into a chain area according to the connection instruction, wherein the chain area is an area where the task object is placed, and M is an integer greater than or equal to 2 and less than or equal to N; and using the chain area as the task object area.

In the above scheme, the step of calling a task management interface according to the task management function instruction includes: arranging the task objects running in background in accordance with a use frequency in response to the task management function instruction; and placing M task objects having the highest use frequency in the M areas to form the chain of task objects, and calling the task management interface to display the M areas.

In the above scheme, the step of updating the chain of task objects currently displayed according to the movement instruction includes: acquiring a first moving speed corresponding to the movement instruction; determining a first sliding speed of the chain of task objects according to the first moving speed and a correspondence relationship between a preset moving speed and a sliding speed of the task object; and moving a position of the chain of task objects currently displayed in the task object area according to the first sliding speed.

In the above scheme, n response to a deletion function as the functional processing, after the functional processing is performed on the task object to be processed through the function area, the method further includes: clearing the task object to be processed in the task object area and the first representation in the representation area; and moving a position of a first task object in the task object area in sequence according to a preset sequence to fill in the position of the task object to be processed, wherein the first task object is another task object except for the task object to be processed among the task objects running in the background.

In the embodiment of the present disclosure, there is provided a terminal, including: a reception unit configured to receive a task management function instruction; a display unit configured to call a task management interface according to the task management function instruction, wherein the task management interface includes a task object area comprised of a chain of task objects and a function area; a determination unit configured to determine a task object to be processed in the task object area; and a processing unit configured to perform functional processing on the task object to be processed through the function area.

In the above terminal, the task management interface further includes: a representation area; wherein the display unit is further configured to display a first representation corresponding to the task object to be processed through the representation area after the task object to be processed is determined in the task object area.

In the embodiment of the present disclosure, there is further provided a terminal, including: a processor, a receiver, a display, and a memory that stores instructions executable by the processor, wherein the memory, the receiver, and the display rely on the processor to implement operations through a communication bus, when the executable instructions are executed by the processor, the aforementioned data processing method is executed.

In the embodiment of the present disclosure, there is provided a computer-readable storage medium that stores executable instructions, when the executable instructions are executed by at least one processor, the aforementioned data processing method is executed.

In the embodiment of the present disclosure, there are provided a data processing method, a terminal and a storage medium, wherein the terminal receives a task management function instruction; calls a task management interface according to the task management function instruction, wherein the task management interface includes a task object area comprised of a chain of task objects and a function area; determines the task object to be processed in the task object area; performs a functional processing on the task object to be processed through the function area. By means of the above technical implementation scheme, since the terminal can display the task object area comprises of chain tasks on the task management interface, the selection range of task objects can be expanded. The terminal can possibly select the task object to be processed from the chain of task objects and perform the functional processing on the task object to be processed in the function area. As such, it is possible to avoid the conversion of a plurality of operation interfaces, simplify the task management process and improve work efficiency.

DETAILED DESCRIPTION OF THE EMBODIMENTS

The technical schemes in the embodiments of the present disclosure will be clearly and completely described below with reference to the drawings therein.

The term terminal herein refers to a mobile electronic equipment, also known as a mobile device, a portable device, a handheld device, a wearable device and a vehicle terminal, etc., which is a computing device based on an embedded chip, usually having a small display screen, a touch input, or a small keyboard, and which is not limited by the embodiments of the present disclosure.

In the embodiments of the present disclosure, there is provided a device used for a data processing method, that is, a data processing device. In practical applications, each of functional modules in the data processing device may be implemented in collaboration by hardware resources of the device (such as a terminal equipment, a server or a server cluster), and computing resources (such as a processor) and communication resources (for example, used to support communication in various ways such as optical cables and cellular).

Of course, the embodiments of the present disclosure are not limited to be provided as a method and hardware, and may be embodied in various implementations, for example, a storage medium (that stores data processing instructions provided for implementing the embodiments of the present disclosure). Implementations will be illustrated by way of examples.

Here, a data processing method according to the embodiments of the present disclosure is described by way of applying to a terminal device as an example.

Embodiment 1

Figure 1:
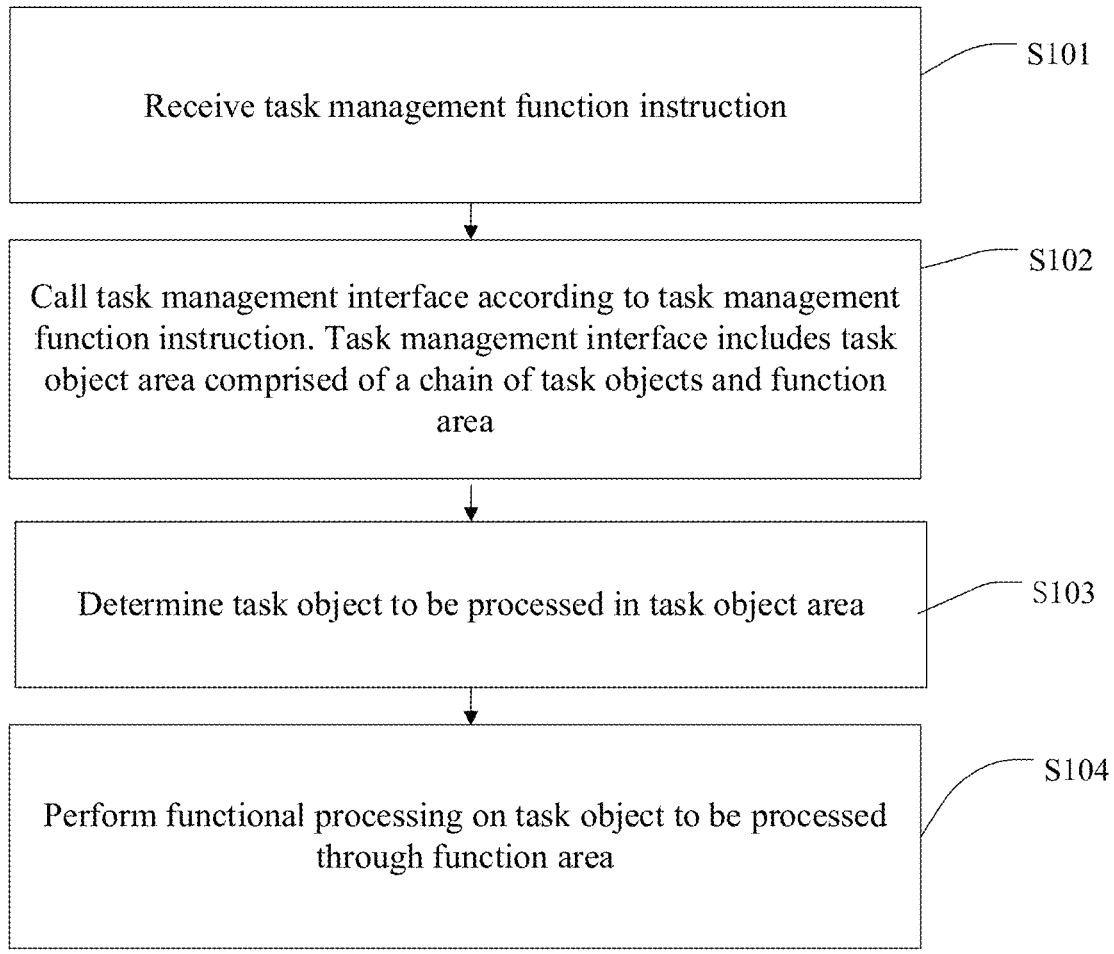
FIG. 1 is a first flow chart illustrating a data processing method according to an embodiment of the present disclosure.

In the embodiment of the present disclosure, there is provided a data processing method. As shown in FIG. 1, the method may include:

S101: receiving a task management function instruction.

In the embodiment of the present disclosure, the terminal supports a recent task management function, that is, a task management function. The task management function refers to a function of managing recently run background applications, for example, performing functional operations such as clear, lock, and entry of recent background applications, which are not limited in the embodiment of the present disclosure.

In the embodiment of the present disclosure, tasks may include running tasks of different applications installed on the terminal, and may also include running tasks of a plurality of objects for a single application, such as a plurality of picture processing tasks of a gallery application. Types of tasks are not limited in the embodiment of the present disclosure.

In other words, the data processing method according to the embodiment of the present disclosure may be used to manage applications installed on the terminal via a task management application on the terminal, or may also be applied to the task management mode of existing applications on the terminal, which is not limited by the embodiment of the present disclosure.

During the task management in the terminal, the user activates the task management function through an operation. In other words, a task management function instruction is received. As such, the terminal may perform data processing in the task management.

In the embodiment of the present disclosure, the task management function may be activated by triggering a HOME key, or triggering a predefined task management button, or triggering a predefined task management gesture. The trigger mode may be implemented in various ways such as a double-click, a click, a slide-click, or a long-press, which is not limited in the embodiment of the present disclosure.

In the data processing method according to the embodiment of the present disclosure, before the terminal performs the task management function, task management settings are required on a task management application or an application for performing the task management. The task management function in the embodiment of the present disclosure includes a task object area and a function area. Therefore, the task object area and the function area are required to be set in the terminal in advance. Herein, the terminal may display a frame for performing task management functions through the task management interface in the task management application. In other words, the task object area and the function area may be displayed when the task management interface is opened.

It should be noted that distribution positions, sizes and shapes of the two areas on the task management interface are not limited when the terminal sets the task object area and the function area.

In the embodiment of the present disclosure, a number, an arrangement and a position of the task object are required to be set when the terminal sets the task object area, and a function implementation mode, a function key or a function trigger mode (for example, the terminal may also implement different processing functions through a directional sliding operation) in the function area may be set when the terminal sets the function area, which is not limited in the embodiment of the present disclosure.

For the processing function implemented by the function key, the terminal may set a correspondence relationship between an area position and a function type of the function key.

Figure 2:
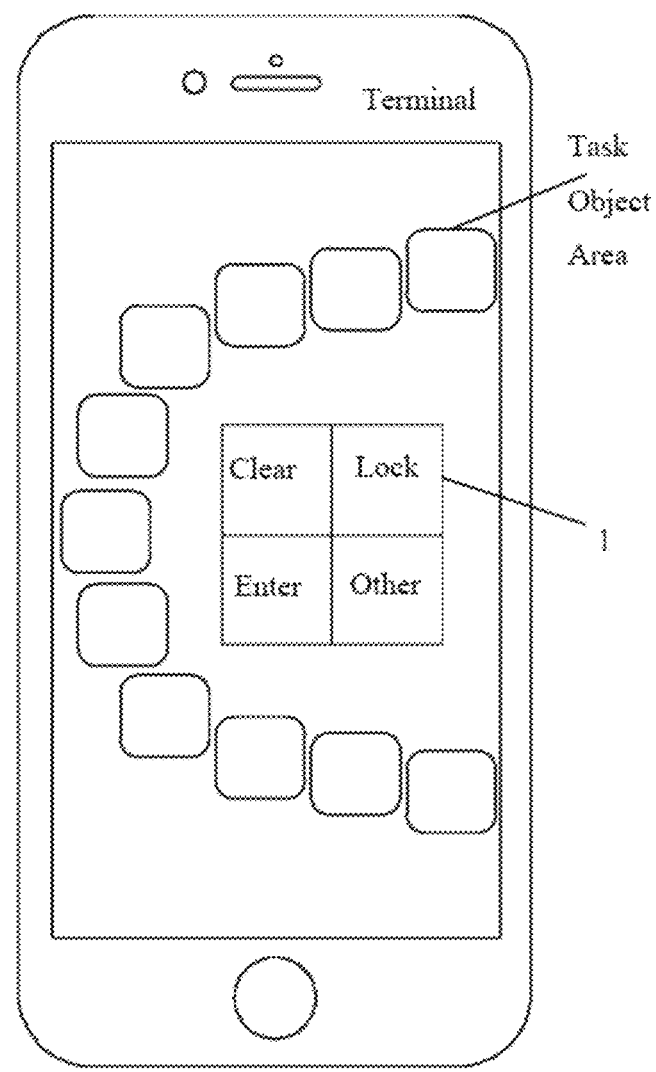
FIG. 2 is a first schematic diagram of a task management interface for a function area according to an embodiment of the present disclosure.

Exemplarily, in the embodiment of the present disclosure, the functional processing for the task object may include: deletion (clear), enter, lock, etc., and the processing function may be implemented by setting function keys such as Delete (Clear), Enter, Lock, etc., in a function area 1 (as shown in FIG. 2).

In the embodiment of the present disclosure, the task objects in the task object area may be set to be chained, i.e., a chain of task objects. The setting of task objects in chain may display a plurality of task objects, which increases the number of task objects available for processing. The shape and position layout of the chain of task objects are not limited in the embodiment of the present disclosure.

It should be noted that in the embodiment of the present disclosure, the distribution and number of function areas are not limited. In other words, the position distribution of the function keys in the function area may be concentrated in a position area, or may be set separately in different position areas, which is not limited in the embodiment of the present disclosure.

Exemplarily, as shown in FIG. 2, function keys such as Delete (Clear), Enter, Lock and Other, etc., in the terminal may be disposed in area 1 of the task management interface.

Figure 3:
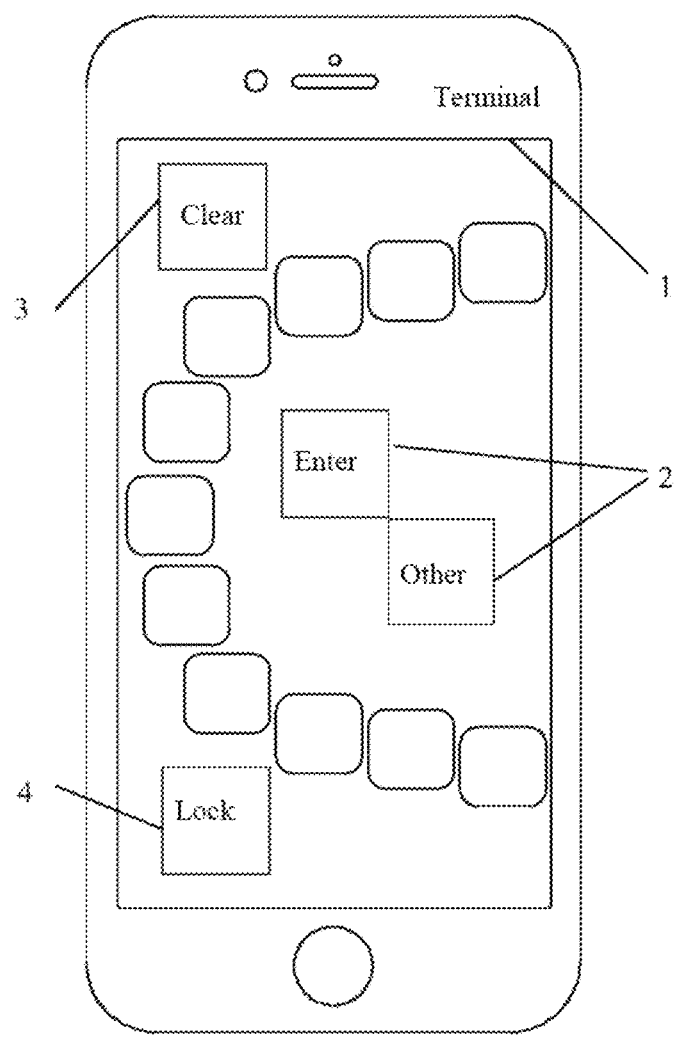
FIG. 3 is a second schematic diagram of the task management interface for the function area according to an embodiment of the present disclosure.

As shown in FIG. 3, the function keys such as Delete (Clear), Enter, Lock and Other, etc., in the terminal may be disposed in an area 2, an area 3, and an area 4 in the task management interface.

For implementing the directional processing functions, the terminal may directionalize the function operations, and implement the processing functions through the combination of directions and gestures. Therefore, the terminal may set the correspondence relationship between the direction and the function type according to directionality.

It should be noted that the terminal may directionalize the function area such that the four most commonly used function keys are directionalized. After the user selects the task object, different processing functions may be triggered by gesture operations in different directions.

Figure 4:
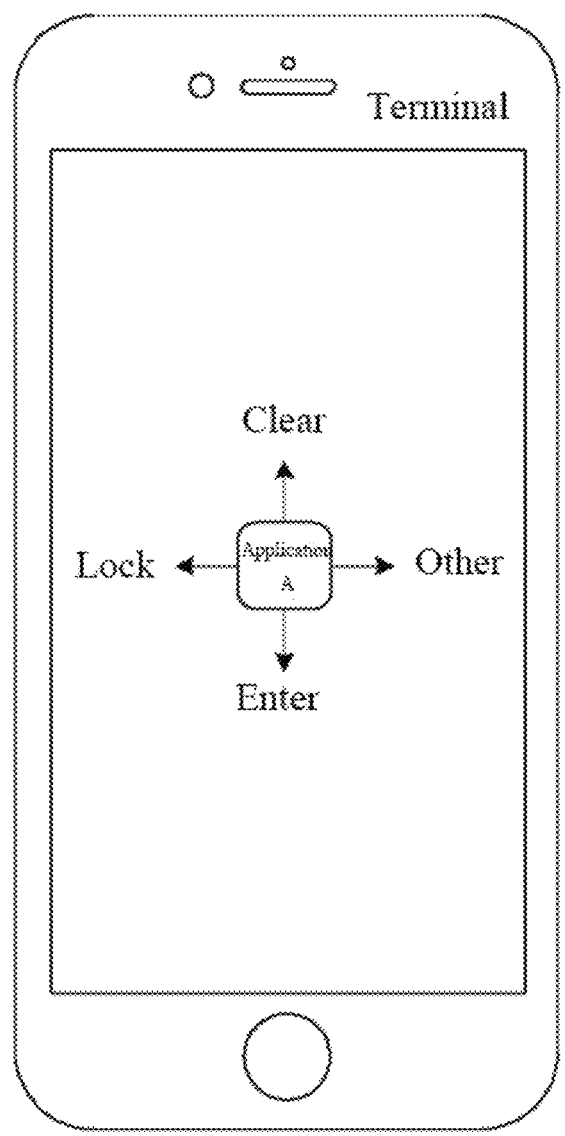
FIG. 4 is a directional interface diagram of the task management interface for the function area according to an embodiment of the present disclosure.

Exemplarily, as shown in FIG. 4, the terminal directionalizes four functions, i.e., Delete (Clear), Enter, Lock and Other around an application A (task object) to complete setting the correspondence relationship between the direction and the function type. For example, an upward represents a clear operation, a downward represents an enter operation, a leftward represents a lock operation, and a rightward can enter other functions of the menu for more operations.

In the embodiment of the present disclosure, the function area is editable, and the user may edit the area position of the function buttons through the terminal according to his or her own use habits, so as to adapt to the user's operation habits. For example, a left-handed user may dispose the function buttons on a left side of the task management interface of the terminal (for example, the Clear button as shown in FIG. 3), and a right-handed user may dispose the function buttons on a right side of the task management interface of the terminal (for example, the Enter and Other buttons as shown in FIG. 3), or in the case where the user is accustomed to one-handed operation, the function buttons may be disposed under the task management interface of the terminal (for example, the Lock button as shown in FIG. 3), which is not limited in the embodiment of the present disclosure.

It should be noted that the Other button in the embodiment of the present disclosure is used to instruct to enter an interface with more functions, and the Other button may be triggered to implement more function selections and functional processing.

Optionally, the function area may be disposed around the task object area.

In the embodiment of the present disclosure, the terminal may set the function types (i.e., processing functions) in the function area according to different task objects. For example, for the management of recent applications, the processing functions of the function area may include: clear, enter and lock. With respect to the management of pictures in a picture application, the processing functions of the function area may include: delete, share and edit. With respect to the management of documents in a document application, the processing functions of the function area may include: delete, share, download and edit. The specific processing functions in the function area may be set as actually required, which are not limited in the embodiment of the present disclosure.

S102: calling a task management interface according to the task management function instruction. The task management interface includes a task object area comprised of a chain of task objects and a function area.

After the terminal receives the task management function instruction, since the terminal has set various areas in the task management interface in advance, the terminal may call up the predefined task management interface according to the task management function instruction. Since the terminal may set the task object area and function area in the task management interface in advance, after the terminal receives the task management function instruction, the terminal may place the predefined function area and the task objects to be managed in the task object area to display on the task management interface, i.e., call the task management interface. In this regard, the task management interface includes a task object area comprised of a chain of task objects and a function area.

In the embodiment of the present disclosure, the chain of task objects may be displayed on the task management interface as a task object identifier, and the task object identifier may be a text, and an identifier such as an object icon and a symbol, which is not limited in the embodiment of the present disclosure.

In the embodiment of the present disclosure, due to different types of tasks, the task management function may be used to manage recently used applications, and may also be used to manage different processing objects of an application. The type of the above-mentioned application, as long as it is an application comprising a plurality of processing objects with the same attribute, is not limited in the embodiment of the present disclosure.

When managing recently used applications, the terminal will call the task management interface according to the task management function instruction. The task object area on the task management interface displays the recently running background applications. The applications may be presented in the form of a text and an application identifier such as an object icon and a symbol, which is not limited in the embodiment of the present disclosure.

When managing different processing objects of an application, the terminal calls the task management interface according to the task management function instruction. The task object area on the task management interface displays the processing objects of an application, and the processing objects may be presented in the form of a text and an application identifier such as an object icon and a symbol, which is not limited in the embodiment of the present disclosure. For example, in a gallery application, each picture may be a processing object, such that the processing object is presented as a thumbnail, a text or other image identifiers. At this time, the processing functions in the function area may be functions such as sharing, deleting and editing. The processing functions of a specific function area may be set differently in accordance with the applications, which is not limited in the embodiment of the present disclosure.

S103: determining a task object to be processed in the task object area.

After the terminal calls the task management interface according to the task management function instruction, since the task management interface includes the task object area and the task objects are displayed in the task object area, the user may select, through the task object area in the task management interface, the task object to be processed. Therefore, the task object to be processed is determined in the task object area.

Here, the user may select the task object to be processed by triggering the chain of task object in the task object area of the task management interface.

Specifically, the terminal may receive a selection instruction for the chain of task objects in the task object area; and according to the selection instruction, select at least one task object from the task objects in chain as the task object to be processed.

In the embodiment of the present disclosure, the user may perform a trigger operation on the chain of task objects through the task object area of the terminal, and select at least one task object from the task objects in chain as the task object to be processed. In the embodiment of the present disclosure, the user selects one or more task object as the task object to be processed through the terminal. It may be implemented in combination with different trigger modes, which is not limited in the embodiment of the present disclosure. For example, the trigger operation may be a click operation or a long-press operation.

Exemplarily, the terminal displays the chain of task objects in the task object area of the task management interface and selects at least one task object identifier on the chain of task object upon the receipt of a selection instruction triggered by the user. The selection may be performed by a click or long-press. When the selection instruction is triggered by an operation of clicking the task object identifier, a task object is selected as the task object to be processed, and then the function area button is clicked to respond to the processing function of the task object to be processed, such as clear, lock, and enter. The terminal may also click a plurality of task object identifiers for selection, and then perform subsequent functional processing operations. When the selection instruction is triggered by an operation of long-pressing the task object identifier, the terminal selects at least one task object identifier according to the selection instruction, i.e., by long-pressing at least one task object identifier, and through a drag operation, the terminal performs the corresponding functional processing upon the receipt of the movement instruction.

S104: performing functional processing on the task object to be processed through the function area.

After the terminal determines the task object to be processed in the task object area, the terminal may implement the functional processing on the task object to be processed through the function area by operating the selected task object to be processed.

In the embodiment of the present disclosure, the terminal may implement the functional processing on the task object to be processed through the function button or drag operation in the function area after making the selection.

In the embodiment of the present disclosure, after the task object to be processed is selected in the terminal, the function button in the function area is triggered to implement the corresponding processing function. The step of triggering the function button may include a click or a drag operation, which is not limited in the embodiment of the present disclosure.

Specifically, the terminal may receive a first drag instruction of the task object to be processed in the function area; the terminal drags the task object to be processed to a first function area in the function area according to the first drag instruction;

The terminal performs the functional processing on the task object to be processed according to a function type corresponding to the first function area.

In other words, in the embodiment of the present disclosure, the terminal may select the task object to be processed according to the function type (that is, the processing function) corresponding to the drag position (that is, the position of the function button area) indicated by the first drag instruction to implement the processing function.

Figure 5:
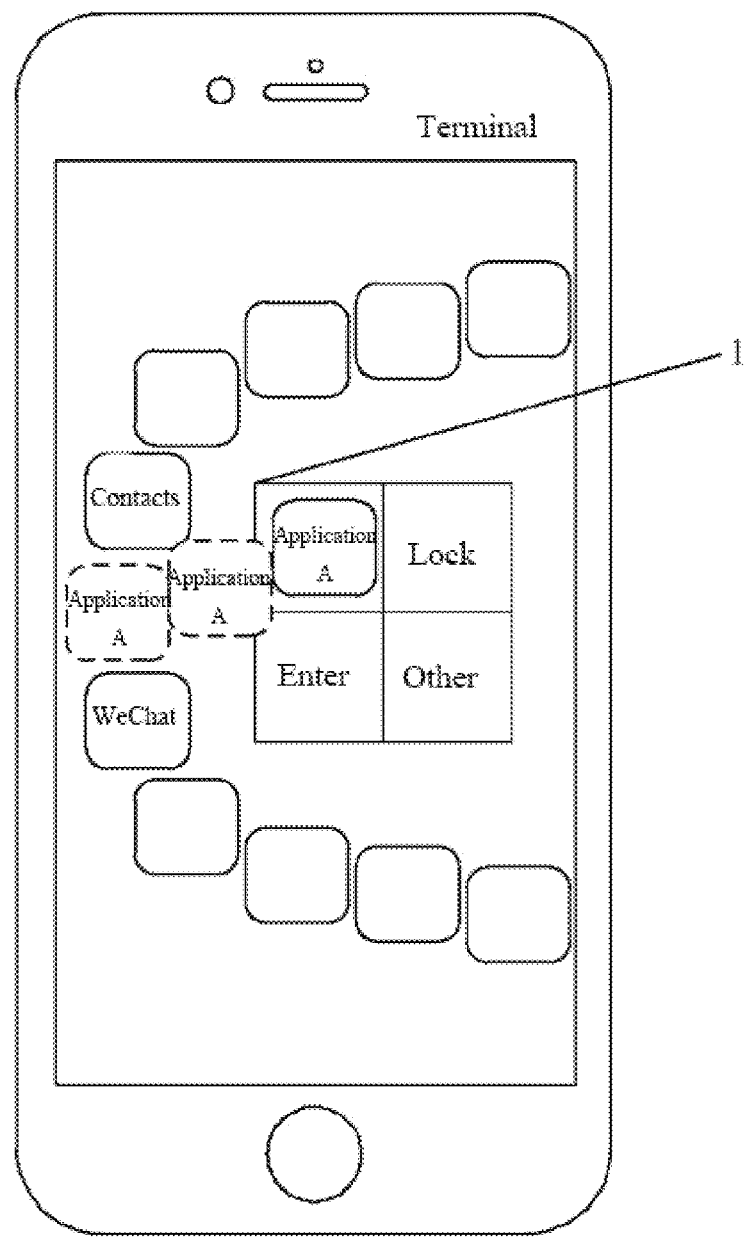
FIG. 5 is an interface diagram of an implementation of a processing function by a drag in the task management interface according to an embodiment of the present disclosure.

Exemplarily, as shown in FIG. 5, the terminal receives a drag operation on application A (the task object identifier of the task object to be processed) to implement the drag of the task object to be processed, by dragging the task object to be processed to a corresponding function area. In this way, the terminal may perform the corresponding function of the application A in response to the drag operation to implement the processing function. For example, the task object to be processed is dragged to a clear area 1 so that the terminal implements the clear function.

Specifically, in the embodiment of the present disclosure, the terminal may also implement the processing function of the selected task object to be processed according to the function type (that is, the processing function) indicated by the click instruction.

Figure 6:
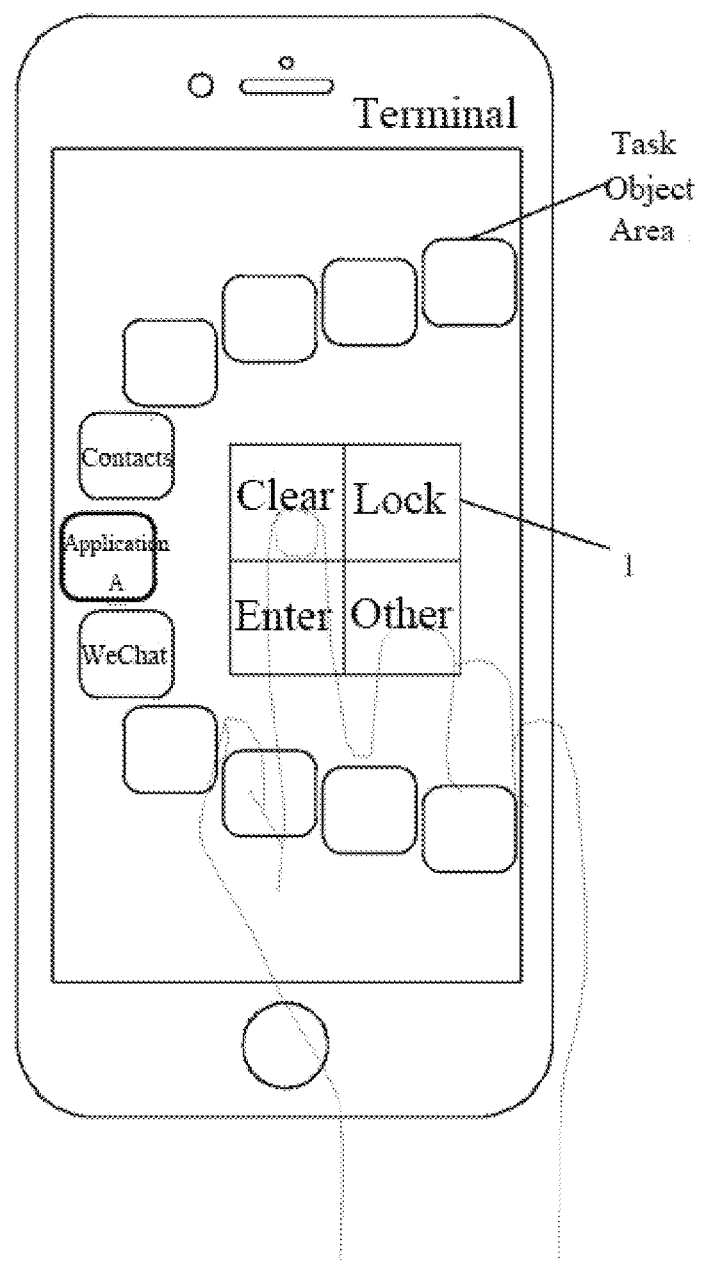
FIG. 6 is an interface diagram of an implementation of a processing function by clicking a button in the task management interface according to an embodiment of the present disclosure.

Exemplarily, as shown in FIG. 6, after the terminal selects the application A (the task object identifier of the task object to be processed), the terminal may trigger a certain processing function according to the function instruction generated when the user clicks the function button in the function area 1. For example, the terminal receives a click on the Clear button to clear the application A, so as to shut down the background operation of the application A.

Specifically, the terminal receives a second drag instruction for the task object to be processed in the function area; when the terminal drags the task object to be processed in a first direction by a preset threshold according to a second drag instruction, the terminal performs functional processing on the task object to be processed according to the function type corresponding to the first direction.

In the embodiment of the present disclosure, the terminal may further implement the processing function of the selected task object to be processed according to the function type (that is, the processing function) corresponding to the drag direction (that is, the first direction) indicated by the second drag instruction.

In the embodiment of the present disclosure, the preset threshold may be a preset distance threshold or a preset time threshold. The type of the preset threshold is not limited in the embodiment of the present disclosure. For example, the preset distance threshold may be 1 cm. The specific value of the preset distance threshold is not limited in the embodiment of the present disclosure. The preset time threshold may be 10 seconds. The specific value of the preset time threshold is not limited in the embodiment of the present disclosure.

Figure 7:
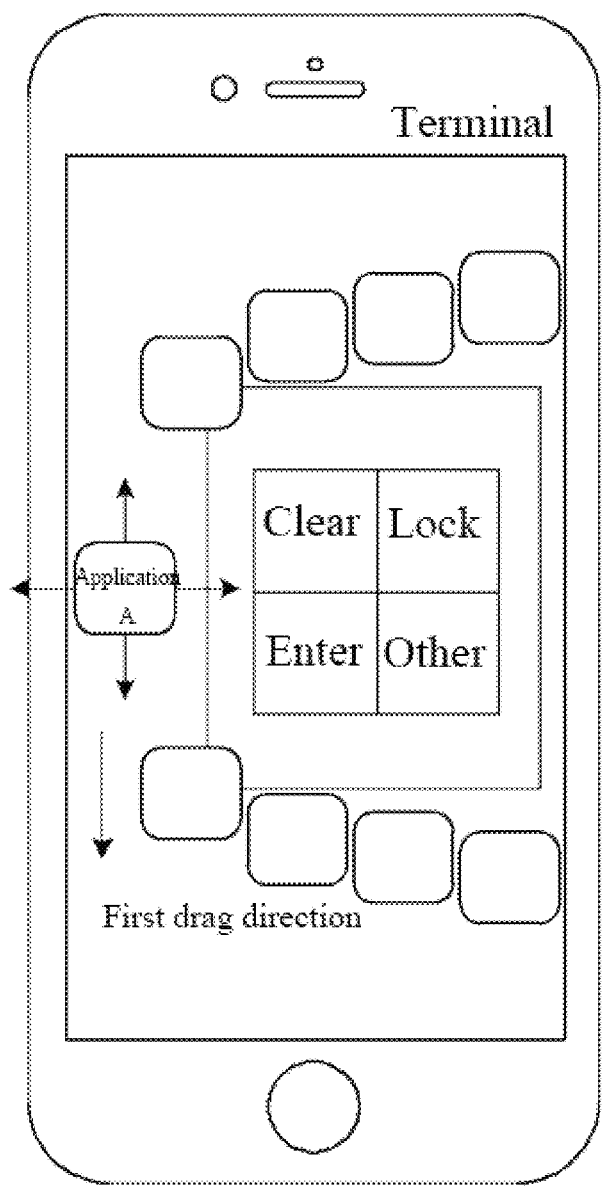
FIG. 7 is an interface diagram of an implementation of a processing function by a directional drag in the task management interface according to an embodiment of the present disclosure.

Exemplarily, as shown in FIG. 7, the terminal receives a drag operation on the application A (the task object identifier of the task object to be processed) to implement the drag operation on the task object to be processed in a specific direction (the first direction) by 1 cm (the preset distance threshold), the terminal responds to the trigger operation of dragging the task object to be processed in the specific direction. In this way, the operation of a certain processing function may be triggered to respond to the corresponding function of the application A to implement the processing function. For example, s an upward represents Clear operation, a downward represents an Enter operation, a leftward represents a Lock operation, and a rightward can enter other functions of the menu for more operations.

Here, in the embodiment of the present disclosure, when the terminal implements the processing function (or performs a processing function) to respond to an operation (such as the drag operation and the click operation), the terminal can schedule and respond to the corresponding operation by a background program.

Further, various task objects having geographic and time indicators (i.e., information with privacy or privacy characteristics) provided by the user may be stored on a background server corresponding to the task object management of the terminal. In the meanwhile, the server side may provide authorization to the task objects. For example, a task object is managed and presented based on the authorization to the user providing the task object.

It can be appreciated that, the terminal has set various functions of the function area before performing the task management function, for example, the correspondence relationship between the position and the function type, the correspondence relationship between the direction and the function type, and the function type of the function button area. Therefore, having determined the task object to be processed, the terminal may respond to the operations generated by the user to implement different processing functions, thereby reflecting the diversity and flexibility of the task management.

Figure 8:
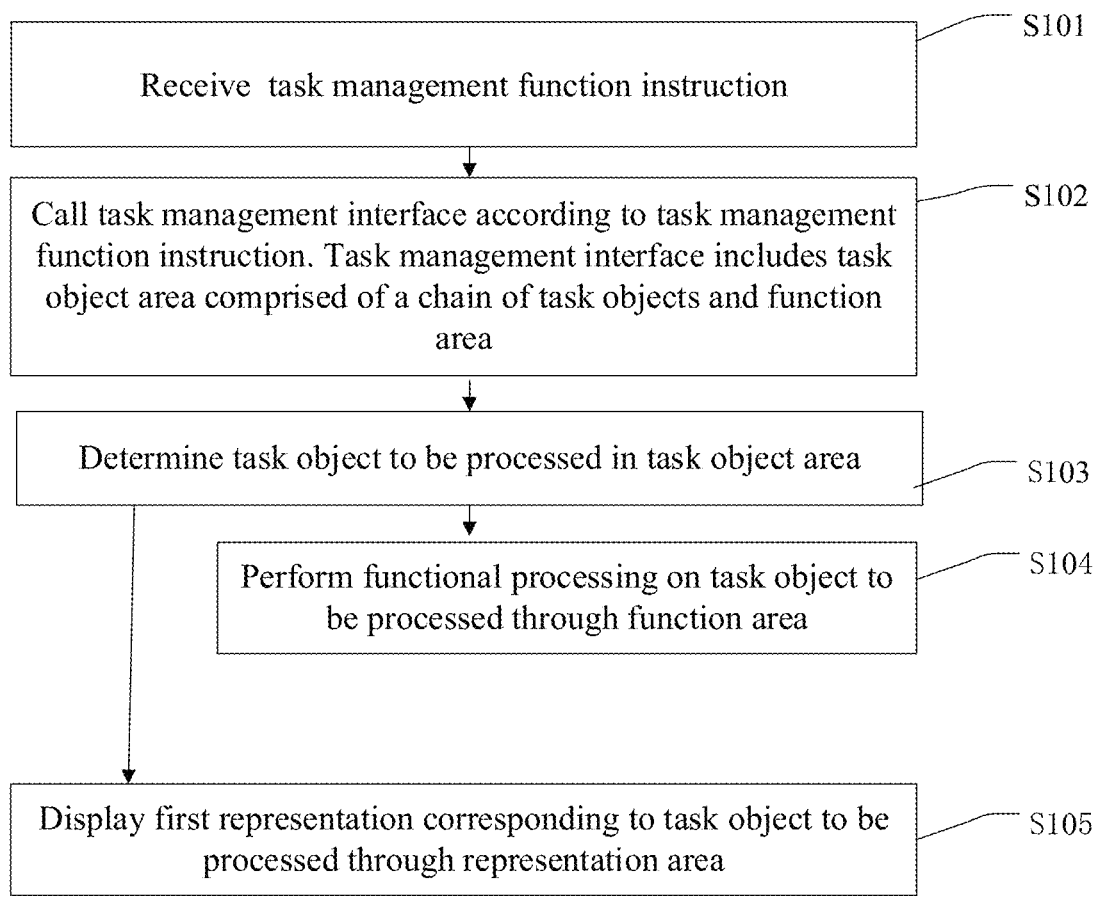
FIG. 8 is a second flow chat illustrating a data processing method according to an embodiment of the present disclosure.

Further, in the data processing method according to an embodiment of the present disclosure, the task management interface further includes: a representation area. As shown in FIG. 8, after S103, the method may further include S105:

S105: displaying a first representation corresponding to the task object to be processed through the representation area.

In addition to the processing task object area and the function area on the task management interface of the terminal, the task management interface of the terminal may also include a representation area for displaying content corresponding to the selected task object to be processed. When the task object to be processed is an application for implementing the recent task management, the representation area displays a representation of a recently used run-interface corresponding to the application (that is, a screen shot when the application exited the last time), i.e., the first representation. When the task object to be processed is an object in the application for implementing the task management on different objects of the application, the representation area displays a representation of a specific content of the object corresponding to the application, such as picture content or document content, i.e., the first representation. In this way, after determining the task object to be processed in the task object area, the terminal may trigger the displaying of the first representation in the representation area at the time of determining the task object to be processed.

Figure 9:
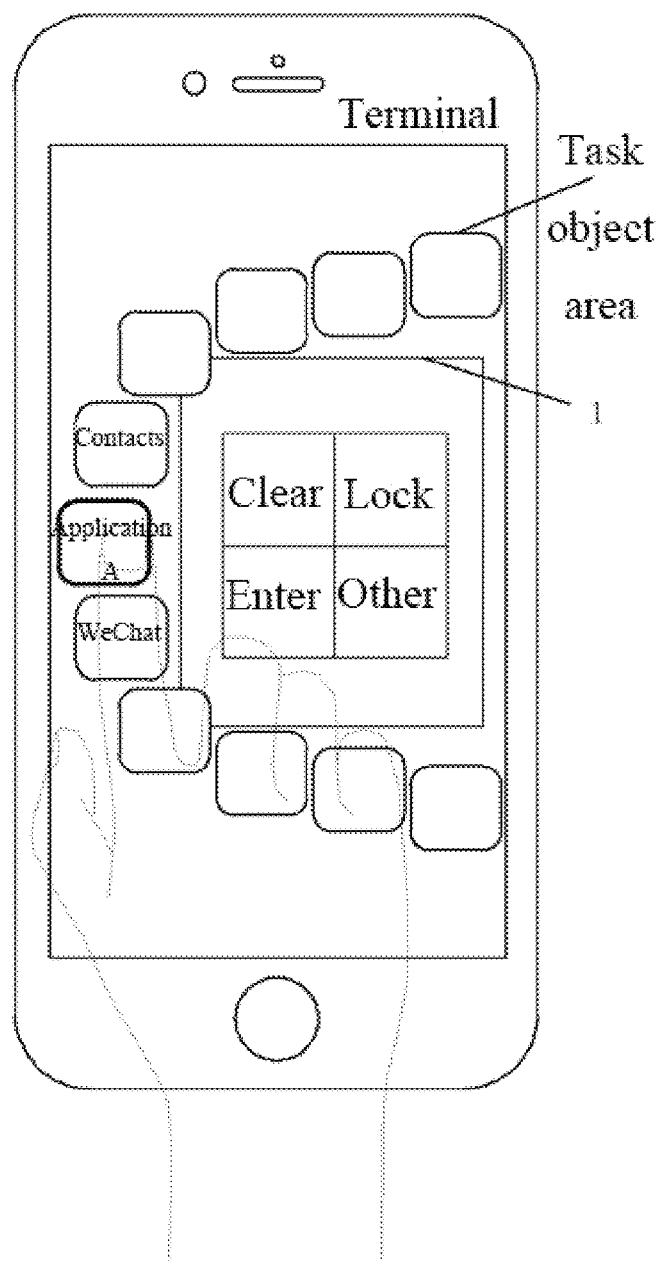
FIG. 9 is an interface diagram of a representation area in the task management interface according to an embodiment of the present disclosure.

Exemplarily, as shown in FIG. 9, after the application A in the terminal is triggered by a click, that is, after the terminal receives a selection instruction, the terminal determines that the application A is the task to be processed. Then, the terminal responds to the selection instruction at the same time, and displays a screen shot of the task object to be processed in the representation area 1, that is, a representation of the interface when the application A recently exited, i.e., the first representation.

In the embodiment of the present disclosure, the task object area and the representation area in the task management interface of the terminal are not overlapped. The task object area and the function area are not overlapped. However, the representation area and the function area may or may not be overlapped. When there is an overlapping area between the representation area and the function area, the function area may be suspended over the representation area with the function buttons arranged in sequence. The order, position and shape of the arrangement of the function buttons are not limited in the embodiment of the present disclosure. The function area may be semi-transparent. In this way, the display of the representation area is not affected, and the space utilization rate can be improved.

Embodiment 2

Figure 10:
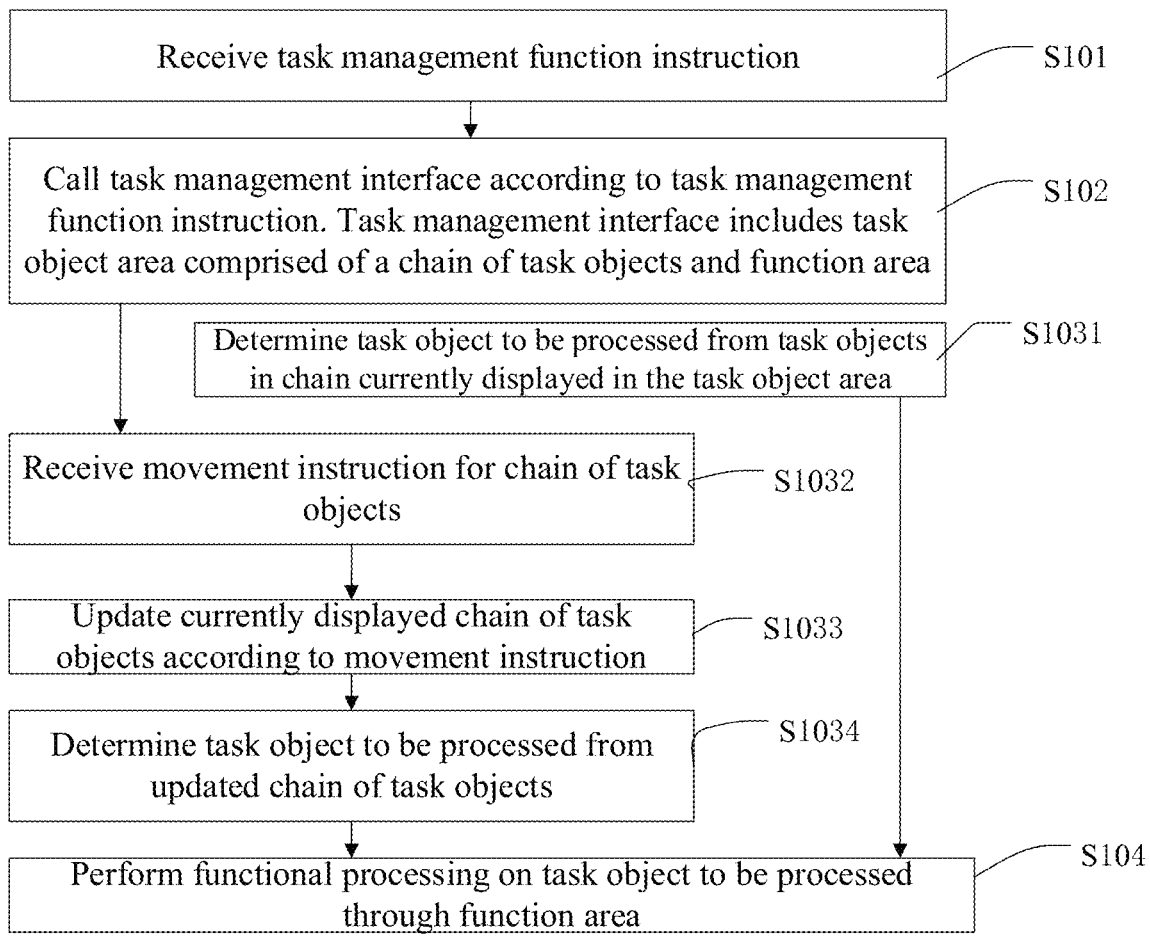
FIG. 10 is a third flow chat illustrating a data processing method according to an embodiment of the present disclosure.

Under the same inventive concept of the first embodiment based on FIG. 1, there is provided a data processing method in the embodiment of the present disclosure. As shown in FIG. 10, the implementation of S103 may include Steps S1031-S1034, which will be described hereinafter.

S1031: determining the task object to be processed from the task objects in chain currently displayed in the task object area.

When the terminal determines the task object to be processed from the task object area, the task objects in the task object area are a chained form, that is, a chain of task objects. In the embodiment of the present disclosure, due to the limitation of the display screen of the terminal, the display area of the current display interface of the terminal may be limited. Then when the user uses more applications or more objects in an application recently, there will be a lot of task objects that are required to be displayed in the task object area. However, due to the limitation of the display, the number of task objects currently displayed in the task object area of the terminal will be limited, and only a part of the chain of task objects may be displayed. At this time, if the task object desired to be selected by the user is presented in the currently displayed chain of task objects, the user will select the task object to be processed by a click or other operations, that is, the terminal receives the selection instruction, so that the terminal can determine the task object to be processed according to the selection instruction.

In the embodiment of the present disclosure, the order of the chain of task objects currently displayed in the task object area on the task management interface of the terminal is arranged in advance by the terminal. The terminal may arrange the task objects based on the use frequency, use time or use habit data of the task objects displayed in an area corresponding to the chain of task objects when the task management interface is called. In particular, the terminal may arrange and display task object identifiers corresponding to the frequently used task objects at a top position on the home page. Alternatively, the terminal may arrange and display task object identifiers corresponding to frequently used task objects in the middle position of the home page, and extend the task object identifiers in sequence from the middle position towards both ends. The specific arrangement manner is not limited in the embodiment of the present disclosure.

In the embodiment of the present disclosure, the home page refers to a page in the task object area initially displayed when the terminal responds to the task management function instruction and the task management interface pops out.

Figure 11:
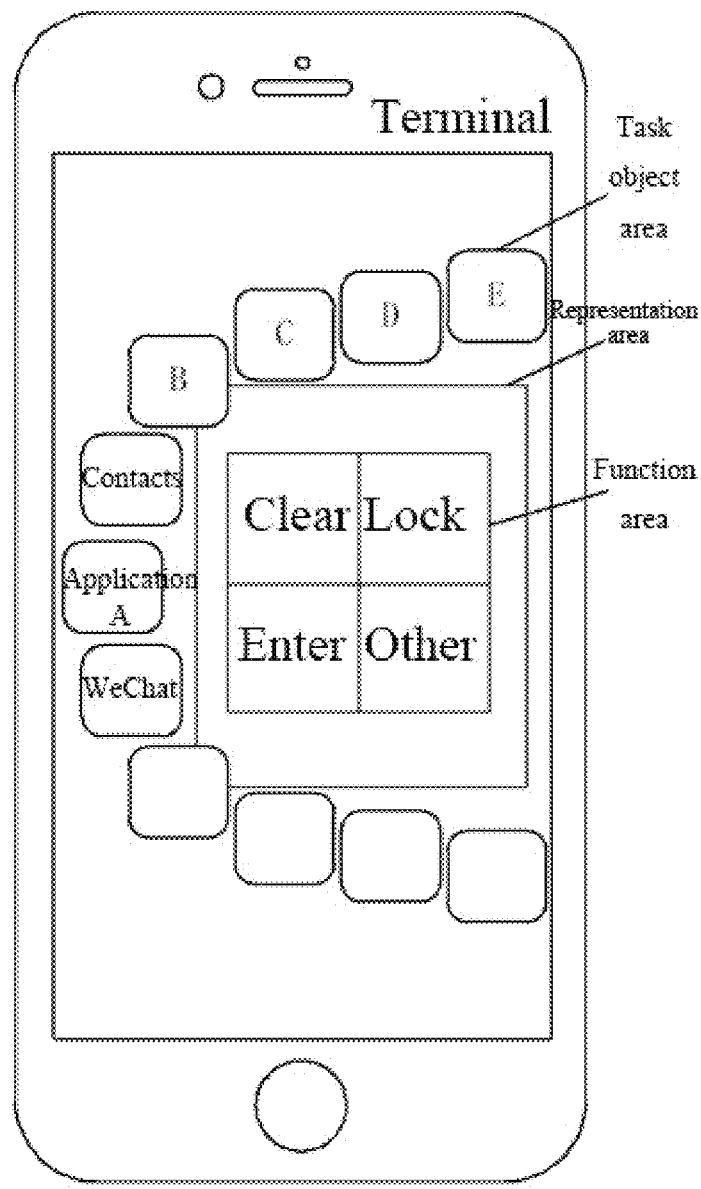
FIG. 11 is an exhibition interface diagram of a chain of task objects according to an embodiment of the present disclosure.

Exemplarily, as shown in FIG. 11, the terminal counts, according to the use frequency, the applications with the use frequencies from high to low, which are: Application A (the task object identifier corresponding to the task object), Contacts and WeChat. Then the terminal may display, when responding to the task management function instruction and calling the task management interface, the task objects in a chain according to a layout from the middle (Application A) to both sides (Contacts and WeChat).

It can be appreciated that the terminal may arrange the display positions of the task objects based on the statistics of the use habits of the task objects. In this way, the display of the task objects can become more reasonable and user-friendly, and can facilitate the user's quickly locating the required task objects for operation.

S1032: receiving a movement instruction for the chain of task objects.

S1033: updating the currently displayed chain of task objects according to the movement instruction.

S1034: determining the task object to be processed from the updated chain of task objects.

When the terminal determines the task object to be processed from the task object area, the task objects in the task object area are in a chained form, that is, a chain of task objects. In the embodiment of the present disclosure, due to the limitation of the display screen of the terminal, the display area of the current display interface of the terminal may be limited. Then when the user uses more applications or more objects in an application recently, there will be a lot of task objects that are required to be displayed in the task object area. However, due to the limitation of display, the number of task objects currently displayed in the task object area of the terminal will be limited, and only a part of the chain of task objects may be displayed while the other part of the chain of task objects are hidden behind the interface. At this time, if the task object desired to be selected by the user wants is not presented in the currently displayed chain of task objects, the user may make the movement operation for displaying more task objects in the task object area, such that and the hidden task objects can be displayed on the current interface. In this way, the terminal may select the task object to be processed in the updated task objects, that is, the terminal receives the selection instruction, so that the terminal can determine the task object to be processed according to the selection instruction.

In the embodiment of the present disclosure, the user performs a movement operation on the task object area on the task management interface, that is, the terminal receives a movement instruction for the chain of task objects in the task object area. The terminal may execute the movement instruction to realize the movement updating of the display position of the entire chain of task objects to display the hidden task object.

Here, the movement instruction may be generated by sliding, or may be generated by triggering a specific gesture. The specific manner of the movement instruction generated by the trigger operation is not limited in the embodiment of the present disclosure.

It should be noted that the movement instruction generated by sliding here may be specifically generated by the user sliding along a tangent direction of the task object area. The terminal may move or update the position of the chain of task objects according to the movement instruction, thereby displaying the hidden task object identifier corresponding to the task object.

Figure 12:
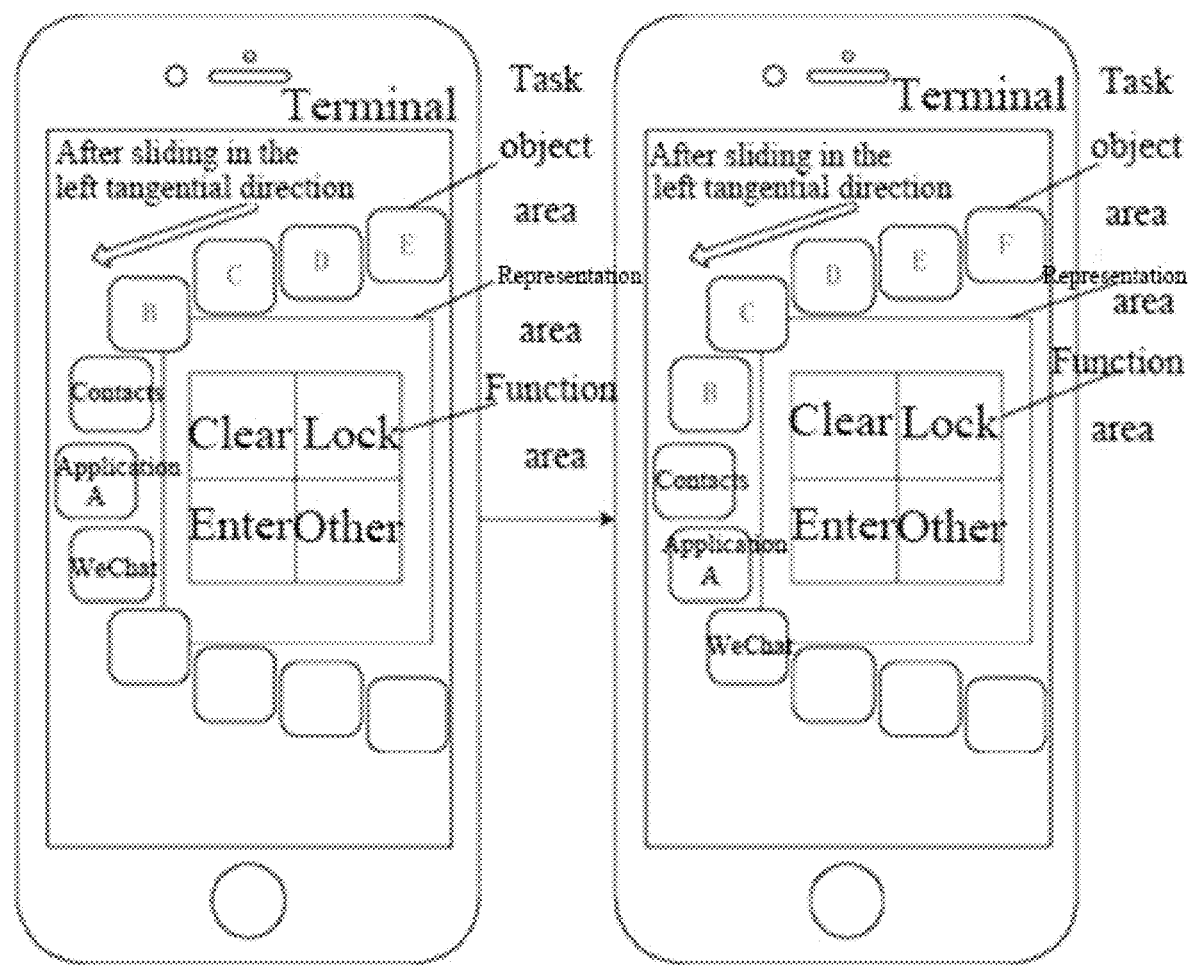
FIG. 12 is an exhibition interface diagram of the switching of the chain of task objects according to an embodiment of the present disclosure.

Exemplarily, as shown in FIG. 12, a part of the chain of task objects currently displayed in the task object area in the task management interface of the terminal include: WeChat, Application A, Contacts, B, C, D and E. The terminal updates, upon the receipt of a movement instruction to slide the task object area in a left tangential direction, the position of the task object in the chain of task objects according to the movement instruction, i.e., moving, so that a display position of each of chain objects is changed counterclockwise in the task object area. The updated the chain of task objects are listed as: WeChat, Application A, Contacts, B, C, D, E and F. Of course, the terminal may also update, upon the receipt of a movement instruction to slide in a right tangential direction in the task object area, the position of the task object in the chain of task objects according to the movement instruction, i.e., moving, so that a display position of each of task objects in the chain is changed clockwise in the task object area.

It should be noted that S1031 and S1032-S1034 are two parallel branches which can be implemented in S103 to determine the task object to be processed in the task object area. The specific branch which is executed in S103 will depend on whether there is a selected task object in the task object currently displayed on the task management interface of the terminal, i.e., on an actual operation received from the user by the terminal, which is not limited in the embodiment of the present disclosure.

Further, the implementation of S1033 may specifically include Steps S10331-S10333, which will be described hereinafter.

S10331: acquiring a first moving speed corresponding to the movement instruction.

S10332: determining a first sliding speed of the chain of task objects according to the first moving speed and a correspondence relationship between a preset moving speed and a sliding speed of the task object.

S10333: moving a position of the chain of task objects currently displayed in the task object area according to the first sliding speed.

In the process of updating the chain of task objects currently displayed according to the movement instruction by the terminal, the chain of task objects currently displayed may also be updated according to the moving speed of the movement instruction.

Specifically, in the embodiment of the present disclosure, the terminal may obtain the first moving speed corresponding to the movement instruction; the terminal may determine the first sliding speed of the chain of task objects according to the first moving speed and the correspondence relationship between the preset moving speed and the sliding speed of the task object, such that the terminal may move the position of the chain of task objects currently displayed in the task object area according to the first sliding speed.

In the embodiment of the present disclosure, the moving speed corresponding to the movement instruction received by the terminal, that is, the first moving speed, may correspond to a speed of controlling the update of the chain of task objects, which is a speed of controlling the chain of task objects to move the position of the chain of task objects currently displayed in the task object area, i.e., the first sliding speed.

It should be noted that the terminal may determine the first sliding speed according to the first moving speed and the correspondence relationship between the preset moving speed and the sliding speed of the task object. In the embodiment of the present disclosure, the correspondence relationship between the preset moving speed and the sliding speed of the task object may be a positive relationship or an inverse relationship, which is not limited in the embodiment of the present disclosure.

It can be appreciated that the terminal may control the update speed (fast or slow) of the task object by the moving speed corresponding to the movement instruction, which reflects the intelligence of the update.

Embodiment 3

Figure 13:
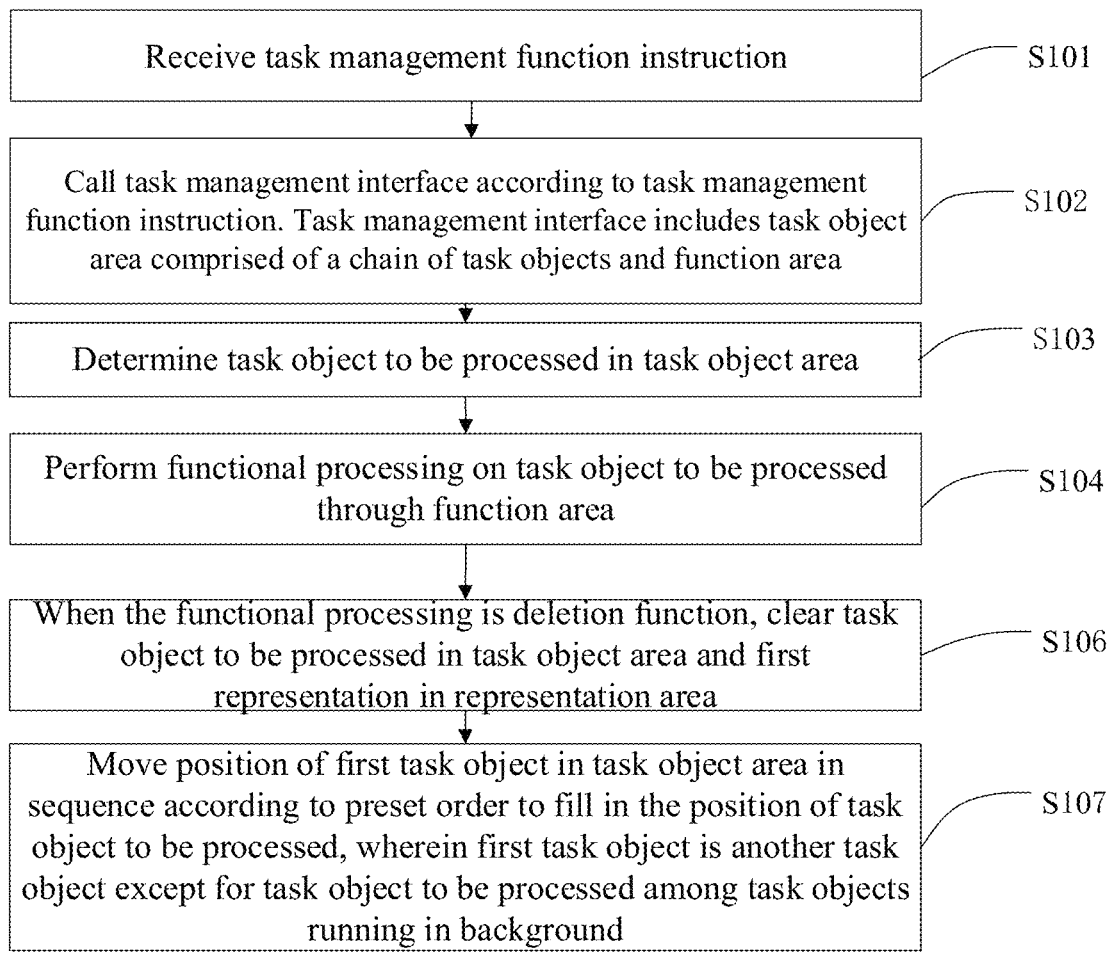
FIG. 13 is a fourth flow chat illustrating a data processing method according to an embodiment of the present disclosure.

Under the same inventive concept of Embodiment 1 and Embodiment 2 based on FIG. 1, there is provided a data processing method in an embodiment of the present disclosure. As shown in FIG. 13, subsequent to S104, the method may further include Steps S106-S107, which will be described hereinafter.

S106: when the functional processing is a deletion function, clearing the task object to be processed in the task object area and the first representation in the representation area.

S107: moving a position of a first task object in the task object area in sequence according to a preset order to fill in the position of the task object to be processed, wherein the first task object is another task object except for the task object to be processed among the task objects running in the background.

After the terminal performs functional processing on the task object to be processed through the function area, the terminal can determine the function type to be performed. There are various types of functions in the embodiment of the present disclosure. Based on the characteristics of the chain of task objects in the embodiment of the present disclosure, when the functional processing is a deletion function, for example, the function type is deletion. When the task object to be processed is selected, the terminal triggers the first representation in the representation area corresponding to the task object to be processed. Therefore, the terminal needs to clear the task object to be processed in the task object area and the first representation in the representation area after the functional processing is performed on the task object to be processed through the function area. In the embodiment of the present disclosure, since the task objects in the chain displayed in the task object area are arranged in sequence, the task object identifier and the first representation of the task object to be processed in the terminal will be cleared when the terminal executes the deletion function. Therefore, a position will be vacated in the task object area. At this time, the terminal may move the position of the first task object in the task object area in a preset sequence to fill in the position of the task object to be processed. The first task object is a task object except for the task object to be processed among the task objects running in the background.

Figure 14:
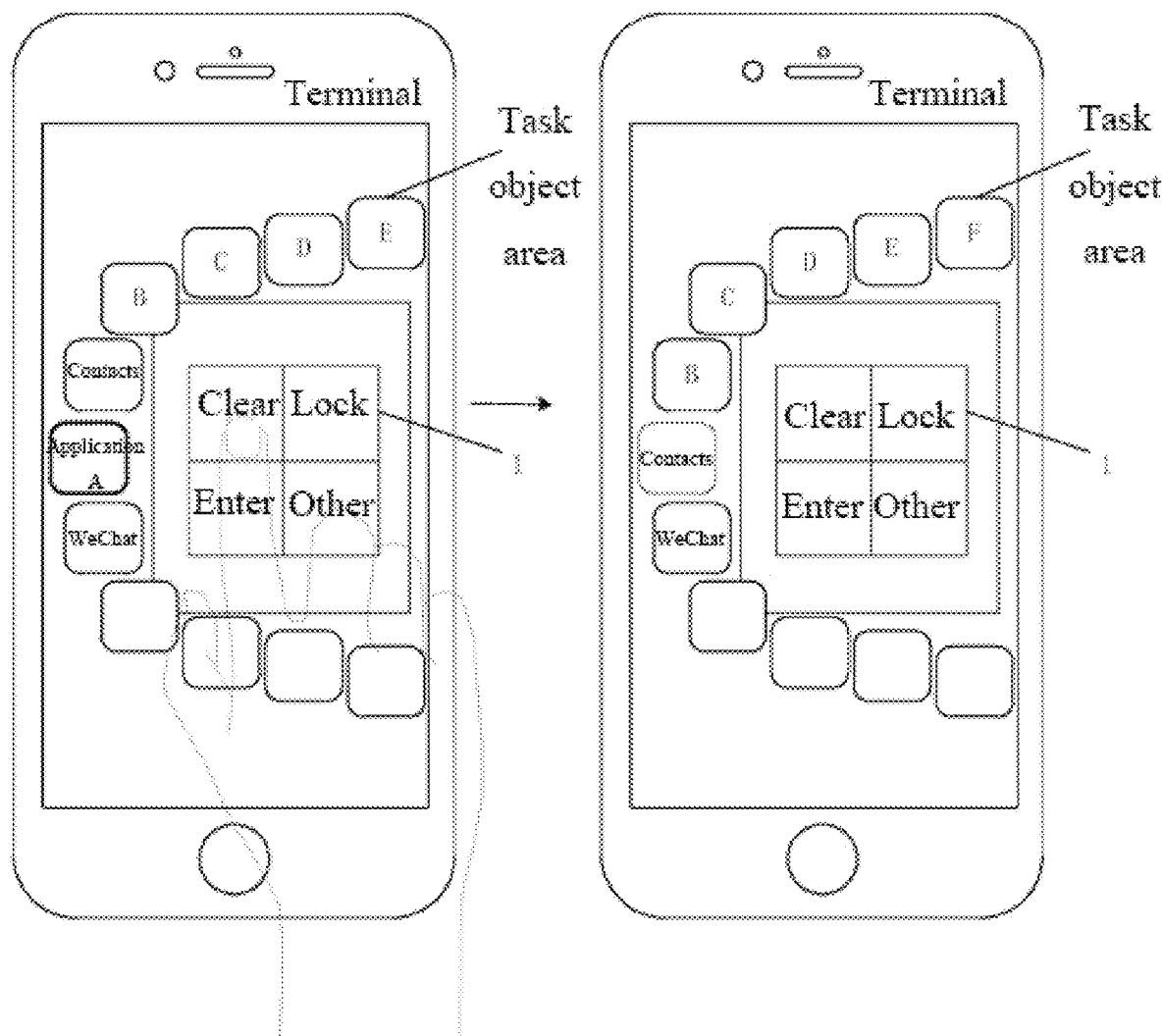
FIG. 14 is an interface diagram of an implementation of a delete function of the task object in the task management interface according to an embodiment of the present disclosure

Exemplarily, as shown in FIG. 14, the terminal clears the task object to be processed, i.e., the Application A. The terminal is capable of deleting the first screen shot (i.e., the first representation) corresponding to the Application A and the identifier of the Application A in the representation area, and filling in the vacancies in a counterclockwise sequence.

It can be appreciated that after deleting or clearing the task object to be processed, the terminal may automatically fill in the blank position to form a new chain of task objects, which reflects the flexibility and automation of the task object arrangement in the task management.

Embodiment 4

Figure 15:
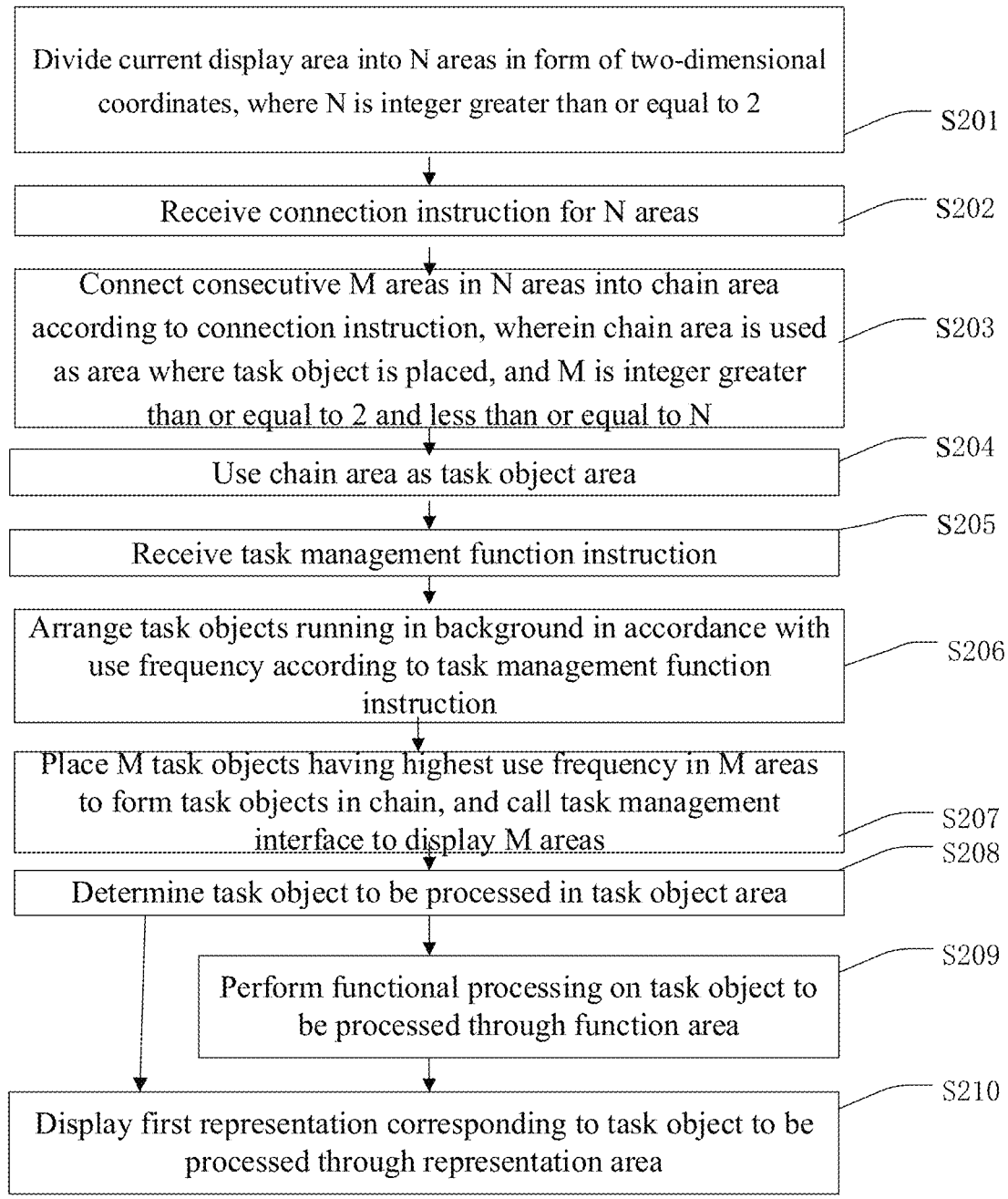
FIG. 15 is a fifth flow chat illustrating a data processing method according to an embodiment of the present disclosure.

Under the same inventive concept of Embodiment 1 to Embodiment 3, there is provided a data processing method in an embodiment of the present disclosure. As shown in FIG. 15, the method may include Steps S201-S210, which will be described hereinafter.

S201: dividing the current display area into N areas in a form of two-dimensional coordinates, where N is an integer greater than or equal to 2.

S202: receiving a connection instruction for the N areas.

S203: connecting consecutive M areas in the N areas into a chain area according to the connection instruction, wherein the chain area is used as an area where the task object is placed, and M is an integer greater than or equal to 2 and less than or equal to N.

S204: using the chain area as the task object area.

In the data processing method according to the embodiment of the present disclosure, before the terminal performs the task management function, task management settings are required to be performed on the task management application or the application for task management. The task management function in the embodiment of the present disclosure includes a task object area, a representation area and a function area. Therefore, the terminal is required to set the task object area, the representation area and the function area in advance. Herein, the terminal may display a screen for task management functions through the task management interface in the task management application. In other words, the task object area, the representation area and the function area may be displayed when the task management interface is opened.

It should be noted that, when the terminal sets the task object area, the representation area and the function area, a distribution position, size, and shape of these areas on the task management interface are not restricted.

In the embodiment of the present disclosure, the number, layout and position of the task objects are required to be set when the terminal sets the task object area. When the terminal sets the function area, the terminal may set the function implementation mode, function keys or a function trigger mode (for example, the terminal may also implement different processing functions through a direction sliding operation) in the function area, which is not limited in the embodiment of the present disclosure.

In the embodiment of the present disclosure, the task object area and the representation area in the task management interface of the terminal are not overlapped. The task object area and the function area are not overlapped. However, the representation area and the function area may or may not be overlapped. When there is an overlapping area between the representation area and the function area, the function area may be suspended over the representation area with the function buttons arranged in sequence. The order, position and shape of the arrangement of the function buttons are not limited in the embodiment of the present disclosure. The function area may be semi-transparent. In this way, the display of the representation area is not affected, and the space utilization rate can be improved.

Here, the setting of the representation area and the function area has been described in the previous embodiment, the description of which will be omitted accordingly. A setting process of the task object area will be mainly described below.

In the embodiment of the present disclosure, the setting may be performed in the task settings corresponding to the task management function, the display area of the terminal (for example, the displayable area of the screen) may be used as the current display area. The terminal may divide the current display area into N areas in the form of two-dimensional coordinates, where N is an integer greater than or equal to 2. That is, the entire screen of the terminal is divided into a plurality of points in the form of x and y two-dimensional coordinates (a point is considered as a small area). The N areas may comprise n*m areas, where n is the number of rows, m is the number of columns, and m and n are both integers greater than or equal to 1. In this way, the current display area is divided regularly. The method of dividing the N areas is not limited in the embodiment of the present disclosure. Therefore, the user may determine the shape and position of the task object area where the task objects in the chain are located by connecting the N areas. Specifically, the terminal receives the connection instruction generated by a connection operation on N areas in the current display area. According to the connection instruction, the terminal connects consecutive M areas in the N areas into a chain area, and the chain area is used as an area where the task objects are placed, where M is an integer greater than or equal to 2 and less than or equal to N. The chain area is used as the task object area.

In the embodiment of the present disclosure, the task object area is editable, that is, it may be set. The user may set the chain area according to his/her preference and demands. Here, the terminal divides the entire screen into a plurality of point areas in the form of x and y two-dimensional coordinates. The user may connect arbitrary numbers of dot areas. In this way, upon the receipt of the connection instruction the terminal may reconstruct the chain area, i.e., the task object area, according to a connection order indicated by the user operation.

It should be noted that, in the embodiment of the present disclosure, the chain area may be in a arc shape or polyline shape, which is not limited in the embodiment of the present disclosure, as long as it is in a chain shape.

In the embodiment of the present disclosure, the number of M is the same as the number of task objects that may be displayed on the current page. The positions of the M areas are the same as the positions of the task objects. Therefore, M may be set to a value as desirable but at least set to 2.

Figure 16:
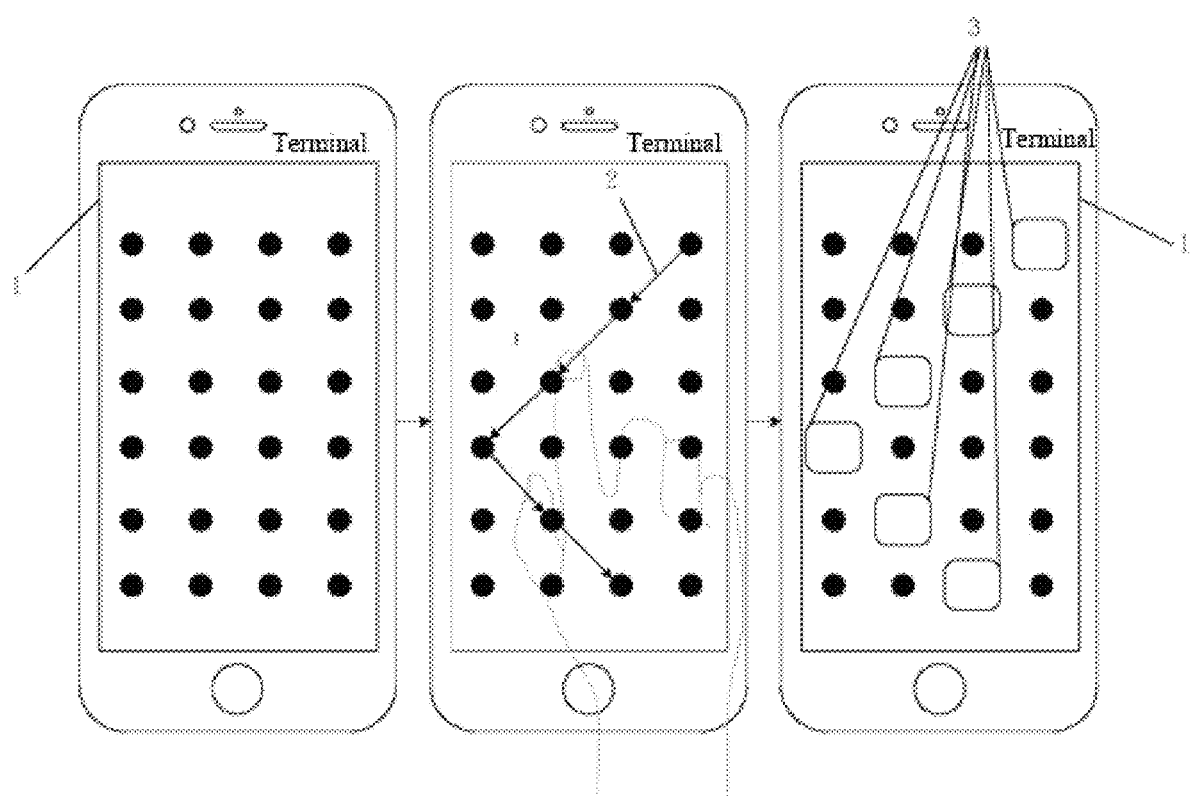
FIG. 16 is an interface diagram of setting a task object area in a current display area according to an embodiment of the present disclosure.

Exemplarily, as shown in FIG. 16, the terminal divides an entire screen area 1 (the current display area) into 6*4 point areas in the form of x and y two-dimensional coordinates. The terminal receives the connection instruction indicating the user performed the connection operation in the 24 point areas, and reconstructs the chain area by a connection line 2 according to the indication order of the connection instruction to form a task target area 3.

S205: receiving a task management function instruction.

After the relevant settings in the task management interface are completed in the terminal, the implementation of the task management function may be initiated.

The process of "receiving the task management function instruction" in the embodiment of the present disclosure is consistent with the description of S101 in Embodiment 1, the description of which will be omitted herein.

S206: arranging the task objects running in the background in accordance with the use frequency according to the task management function instruction.

S207: placing M task objects having the highest use frequency in the M areas to form the task objects in the chain, and calling the task management interface to display the M areas.

The process of S206-S207 in the embodiment of the present disclosure is consistent with the description of S102 in Embodiment 1, the description of which will be omitted herein.

It should be noted that, after the terminal receives the task management function instruction, since the terminal has set various areas in the task management interface in advance, the terminal may call the preset task management interface according to the task management function instruction. Since the terminal may set the task object area, a representation area and function area in the task management interface in advance, after the terminal receives the task management function instruction, the terminal may place the preset function area, the representation area and the task object to be managed in the task object area to display on the task management interface, (i.e., calling the task management interface). In this regard, the task management interface includes the task object area, the representation area comprised of the chain of task objects and the function area.

In the embodiment of the present disclosure, an order of the task objects in the chain currently displayed in the task object area on the task management interface of the terminal is set in advance by the terminal. The terminal may arrange the task objects based on the use frequency, use time or use habit data of the task objects in an area corresponding to the chain task object area and displayed when the task management interface is called. Since the positions of the M areas determine the display positions of the task object, the terminal may set the M task objects having the highest use frequency in M areas to form the task objects in the chain. Thereby, the specific terminal can call the task management interface displaying the M areas.

In the embodiment of the present disclosure, the terminal may arrange and display the task object identifiers corresponding to the frequently used task objects at a top position on the home page. Alternatively, or the terminal may arrange and display the task object identifiers corresponding to the frequently used task objects in the middle position of the home page, and extend the task object identifiers in sequence from the middle position towards both ends. The specific arrangement is not limited in the embodiment of the present disclosure.

Exemplarily, as shown in FIG. 11, the terminal counts, according to the use frequency, the applications with the use frequencies from high to low, which are: Application A (the task object identifier corresponding to the task object), Contacts and WeChat. Then the terminal may display, when responding to the task management function instruction and calling the task management interface, the task objects in a chain according to a layout from the middle to both sides.

It can be appreciated that the terminal may arrange the display positions of the task objects based on the statistics of the use habits of the task objects. In this way, the display of the task objects can become more reasonable and user-friendly, and can facilitate the user's quickly locating the required task objects for operation.

S208: determining the task object to be processed in the task object area.

The process of "determining the task object to be processed in the task object area" in the embodiment of the present disclosure is consistent with the description of S103 in Embodiment 1 and the description of S103 in Embodiment 2, the description of which will be omitted herein.

S209: performing the functional processing on the task object to be processed through the function area.

The process of "performing the functional processing on the task object to be processed through function areas" in the embodiment of the present disclosure is consistent with the description of S104 in Embodiment 1, the description of which will be omitted herein.

S210: displaying a first representation corresponding to the task object to be processed through the representation area.

The process of "displaying the first representation corresponding to the task object to be processed through the representation area" in the embodiment of the present disclosure is consistent with the description of S105 in Embodiment 1, the description of which will be omitted herein.

Exemplarily, the task objects that are a plurality of objects in one application will be described as an example hereinafter.

It is assumed that the one application is a gallery application, and the plurality of objects are picture objects.

Figure 17:
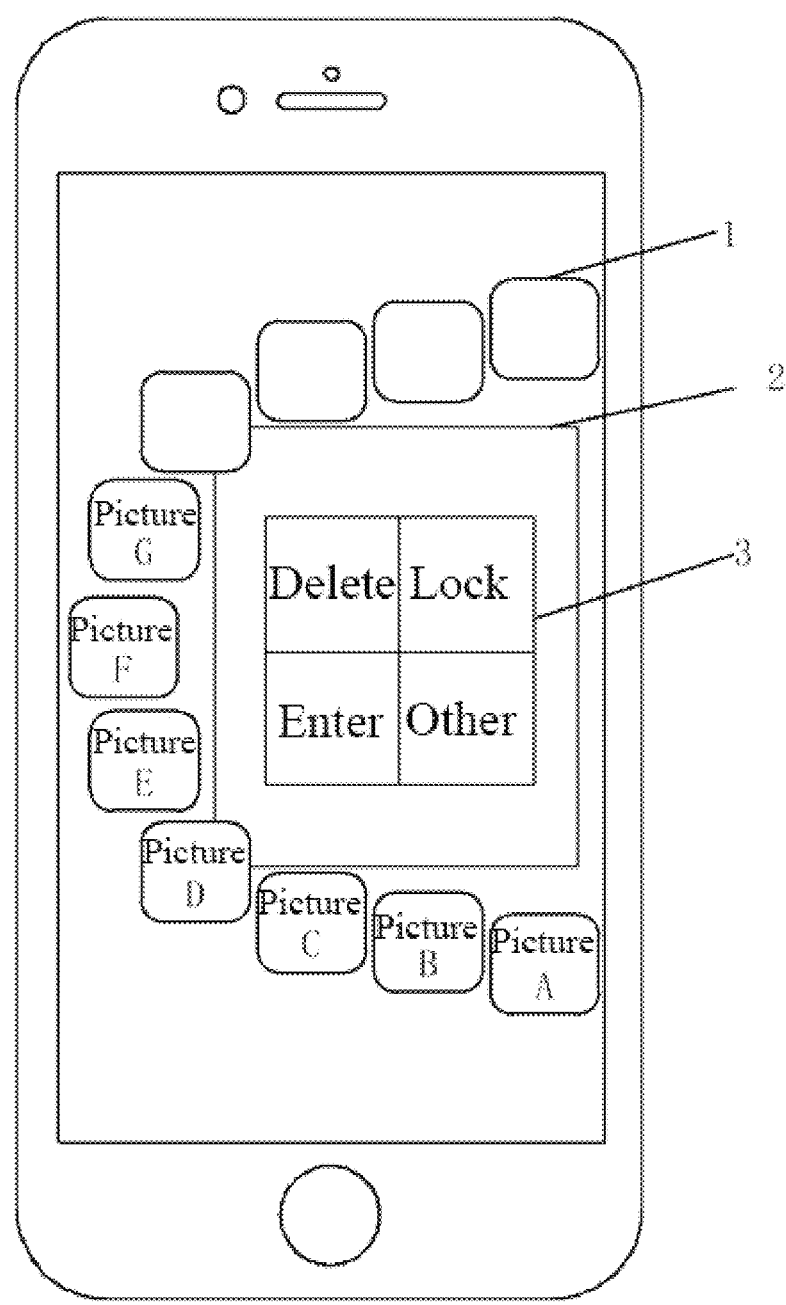
FIG. 17 is a schematic diagram of an area division of a gallery application according to an embodiment of the present disclosure.

The picture browsing scenario of the gallery application may employ the data processing method according to the embodiments of the present disclosure. As shown in FIG. 17, the display area in the gallery application is divided into three areas, which are: I. a picture thumbnail area (a task object area); II. a large picture area (a representation area); and III. a function area, which provides commonly-used functions of the picture object such as deletion, share and edit.

Figure 18:
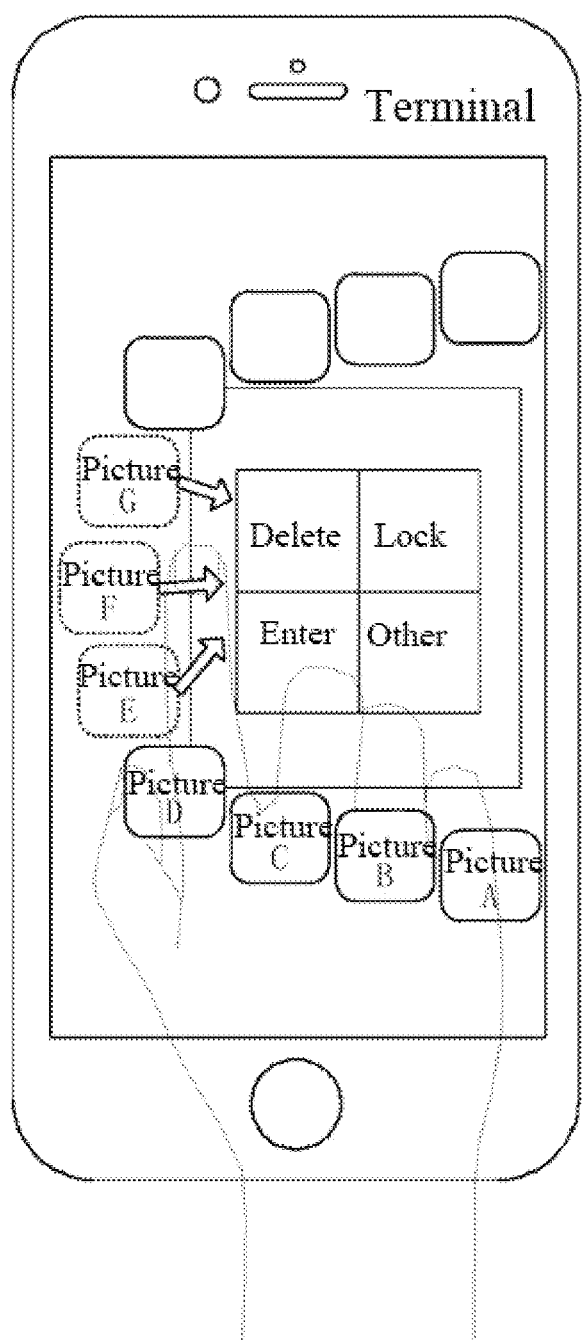
FIG. 18 is an interface diagram of a delete function of a picture object of a gallery application according to an embodiment of the present disclosure.

The terminal may support simultaneous operations of a plurality of picture objects in the gallery application. As shown in FIG. 18, the terminal may select pictures E, G and F in the gallery application according to the received selection instruction. The user drags selected pictures to generate a first drag instruction. Upon the receipt of the first drag instruction, the terminal implements a delete function of the dragged pictures E, G and F according to the first drag instruction.

The terminal may support an enlargement display operation of the picture object in the gallery application to display a large picture. In the gallery application, the terminal may select a picture object according to the received selection instruction, and display a large picture corresponding to the picture object in the large picture area at the same time of selecting the picture object.

The gallery application in the terminal may display a plurality of thumbnails on a single page at the same time of displaying the large picture, and provide fast functional operation modes. As such, it is possible to greatly improve the efficiency of routine operation of gallery pictures and enhance user experience, thereby reflecting the intelligence of the picture processing.

Further, various task objects having geographic and time indicators (i.e., information with privacy or privacy characteristics) provided by the user may be stored on the background server corresponding to the task object management of the terminal. In the meanwhile, the server side may provide authorization to the task objects. For example, a task object is managed and presented based on the authorization to the user providing the task object.

Further, the task objects in the data processing method according to the embodiment of the present disclosure may also be the management of all the applications on the terminal. For example, icons on the desktop may be arranged according to the position of the chain of task object, and function processing such as uninstalling may be provided in the function area. The application scenarios of the data processing method according to the embodiment of the present disclosure are not limited in the present disclosure.

It can be appreciated that, since the terminal may display the task object area comprised of chain tasks on the task management interface, the selection range of task objects can be expanded. The terminal can possibly select the task object to be processed from the task objects in chain. The functional processing can be implemented on the task object to be processed in the function area. In this way, it is possible to avoid the conversion of the plurality of operation interfaces, simplify the task management process and improve work efficiency.

Embodiment 5

Figure 19:
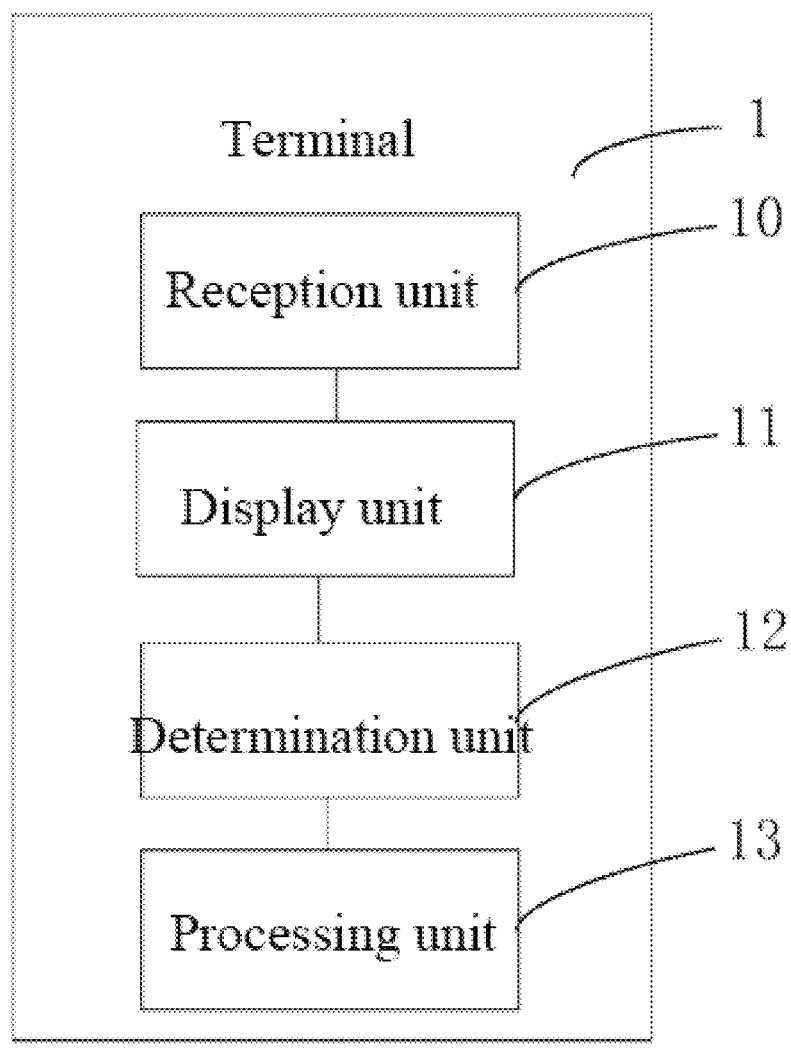
FIG. 19 is a first schematic block diagram illustrating a terminal according to an embodiment of the present disclosure.

Based on the same inventive concept of Embodiment 1 to Embodiment 4, as shown in FIG. 19, in an embodiment of the present disclosure, there is provided a terminal 1, including:

a reception unit 10, configured to receive a task management function instruction;

a display unit 11, configured to call a task management interface according to the task management function instruction, wherein the task management interface includes a task object area comprised of task objects in chain and a function area;

a determination unit 12, configured to determine a task object to be processed in the task object area; and a processing unit 13, configured to perform functional processing on the task object to be processed through the function area.

In some embodiments, the task management interface further includes: a representation area.

The display unit 11 is further configured to display a first representation corresponding to the task object to be processed through the representation area, after the task object to be processed is determined in the task object area.

In some embodiments, the determination unit 12 is specifically configured to determine the task object to be processed from task objects in chain currently displayed in the task object area.

In some embodiments, the terminal 1 further includes: an update unit 14.

The reception unit 10 is further configured to receive a movement instruction for the chain of task objects;

The update unit 14 is configured to update the chain of task objects currently displayed according to the movement instruction;

The determination unit 12 is specifically configured to determine the task object to be processed from the updated chain of task objects.

In some embodiments, the reception unit 10 is further configured to receive a selection instruction for the chain of task objects in the task object area;

The determination unit 12 is specifically configured to select at least one task object from the task objects in chain as the task object to be processed according to the selection instruction.

In some embodiments, the reception unit 10 is further configured to receive a first drag instruction for the task object to be processed in the function area;

The processing unit 13 is specifically configured to drag the task object to be processed to a first function area in the function area according to the first drag instruction; and perform the functional processing on the task object to be processed according to a function type corresponding to the first function area.

In some embodiments, the reception unit 10 is further configured to receive a second drag instruction for the task object to be processed in the function area;

The processing unit 13 is specifically configured to perform the functional processing on the task object to be processed according to the function type corresponding to a first direction, when the task object to be processed is dragged by a preset threshold in the first direction according to the second drag instruction.

In some embodiments, the terminal 1 further includes: a setting unit 15.

The setting unit 15 is configured to set the task object area before receiving the task management function instruction.

In some embodiments, the setting unit 15 is configured to divide the current display area into N areas in the form of two-dimensional coordinates, where N is an integer greater than or equal to 2;

The reception unit 10 is further configured to receive a connection instruction for the N areas;

The setting unit 15 is further configured to connect consecutive M areas in the N areas into a chain area according to the connection instruction, wherein the chain area is an area where the task object is placed, and M is an integer greater than or equal to 2 and less than or equal to N; and use the chain area as the task object area.

In some embodiments, the processing unit 13 is further configured to arrange the task objects running in the background in accordance with a use frequency in response to the task management function instruction; and place M task objects having the highest use frequency in the M areas to form the task objects in chain.

The display unit 11 is specifically configured to call the task management interface to display the M areas.

In some embodiments, the update unit 14 is configured to acquire a first moving speed corresponding to the movement instruction; determine a first sliding speed of the chain of task objects according to the first moving speed and a correspondence relationship between a preset moving speed and a sliding speed of the task object; and move a position of the chain of task objects currently displayed in the task object area according to the first sliding speed.

In some embodiments, the terminal 1 further includes a deletion unit 16.

The deletion unit 16 is configured to, when the functional processing is a deletion function, clear the task object to be processed in the task object area and the first representation in the representation area after the functional processing is performed on the task object to be processed through the function area;

The update unit 14 is further configured to move a position of a first task object in the task object area in sequence according to a preset order to fill in the position of the task object to be processed, wherein the first task object is another task object except for the task object to be processed among task objects running in the background.

In practical applications, the aforementioned determination unit 12, processing unit 13, update unit 14, setting unit 15 and deletion unit 16 may be implemented by the processor 17 provided in the terminal 1, specifically by a Central Processing Unit (CPU), a Microprocessor Unit (MPU), a d Digital Signal Processor (DSP) or a Field Programmable Gate Array (FPGA); the reception unit 10 may be implemented by a receiver 18, and the display unit 11 may be implemented by a display 19, which are not limited in the embodiment of the present disclosure.

Figure 20:
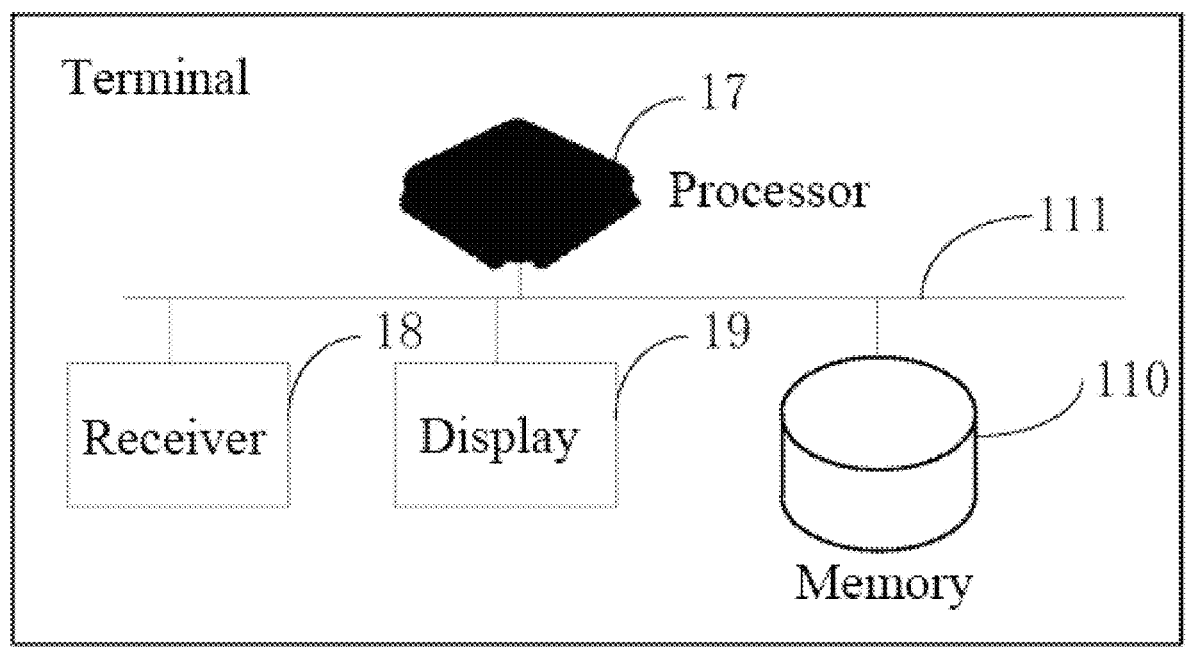
FIG. 20 is a second schematic block diagram illustrating a terminal according to an embodiment of the present disclosure.

As shown in FIG. 20, in an embodiment of the present disclosure, there is further provided a terminal, including: a processor 17, a receiver 18, a display 19 and a memory 110 that stores instructions executable by the processor 17, wherein the memory 110, the receiver 18 and the display 19 rely on the processor 17 to implement operations through a communication bus 111, and when the executable instructions are executed by the processor 17, the aforementioned data processing method is executed.

It should be noted that in practical applications, various components in the terminal are coupled together through the communication bus 111. It can be appreciated that the communication bus 111 is used to implement connection and communication between these components. In addition to a data bus, the communication bus 111 also includes a power bus, a control bus and a status signal bus. However, for clarity of description, various buses are collectively called as the communication bus 111 in FIG. 20.

It can be appreciated that, since the terminal may display the task object area comprised of chain tasks on the task management interface, the selection range of task objects can be expanded. The terminal can possibly select the task object to be processed from the chain of task objects. The functional processing can be implemented on the task object to be processed in the function area. In this way, it is possible to avoid the conversion of the plurality of operation interfaces, simplify the task management process and improve work efficiency.

In the embodiment of the present disclosure, there is provided a computer-readable storage medium that stores executable instructions. When the executable instructions are executed by at least one processor, the processor implements the data processing method according to any one of Embodiments 1 to 4.

Herein, the computer-readable storage medium may be a memory such as a ferromagnetic random access memory (FRAM), a Read Only Memory (ROM), a Programmable Read-Only Memory, (PROM), an Erasable Programmable Read-Only Memory (EPROM), an Electrically Erasable Programmable Read-Only Memory (EEPROM), a Flash Memory, a Magnetic Surface Memory, an optical disc, or a Compact Disc Read-Only Memory (CD-ROM).

Described above are only the preferred embodiments of the present disclosure, which are not intended to limit the protection scope of the present disclosure.

The invention claimed is:

1. A data processing method, comprising:
    setting a task object area;
    receiving a task management function instruction;
    calling a task management interface according to the task management function instruction, wherein the task management interface comprise the task object area comprised of a chain of task objects and a function area;
    determining a task object to be processed in the task object area; and
    performing functional processing on the task object to be processed through the function area,
    wherein the step of setting the task object area comprises:
    dividing an entire display screen into N point areas on basis of two-dimensional coordinates;
    receiving a connection instruction for all the N point areas;
    connecting arbitrary consecutive M areas in the N point areas into a chain area according to the connection instruction, wherein the chain area is an area where the task object is placed, M is an integer greater than or equal to 2 and less than or equal to N and the M areas are a subset of the N point areas; and
    constructing or reconstructing the task object area according to a connection order received from the connection instruction.

2. The method according to claim 1, wherein the task management interface further comprises: a representation area; and after the task object to be processed is determined in the task object area, the method further comprises:
    displaying a first representation corresponding to the task object to be processed through the representation area.

3. The method according to claim 2, wherein, in response to a deletion function as the functional processing, after the functional processing is performed on the task object to be processed through the function area, the method further comprises:
    clearing the task object to be processed in the task object area and the first representation in the representation area; and
    moving a position of a first task object in the task object area in sequence according to a preset order to fill in the position of the task object to be processed, wherein the first task object is another task object except for the task object to be processed among the task objects running in the background.

4. The method according to claim 1, wherein the step of determining the task object to be processed in the task object area comprises:
    determining the task object to be processed from the chain of task objects currently displayed in the task object area.

5. The method according to claim 1, wherein the step of determining the task object to be processed in the task object area comprises:
    receiving a movement instruction for the chain of task objects;
    updating the chain of task objects currently displayed according to the movement instruction; and
    determining the task object to be processed from the updated chain of task object.

6. The method according to claim 5, wherein the step of updating the chain of task objects currently displayed according to the movement instruction comprises:
    acquiring a first moving speed corresponding to the movement instruction;
    determining a first sliding speed of the chain of task objects according to the first moving speed and a correspondence relationship between a preset moving speed and a sliding speed of the task object; and
    moving a position of the chain of task objects currently displayed in the task object area according to the first sliding speed.

7. The method according to claim 1, wherein the step of determining the task object to be processed in the task object area comprises:
    receiving a selection instruction for the chain of task objects in the task object area; and
    selecting at least one task object from the chain of task objects as the task object to be processed according to the selection instruction.

8. The method according to claim 1, wherein the step of performing the functional processing on the task object to be processed through the function area comprises:
    receiving a first drag instruction for the task object to be processed in the function area;
    dragging the task object to be processed to a first function area in the function area according to the first drag instruction; and
    performing the functional processing on the task object to be processed according to a function type corresponding to the first function area.

9. The method according to claim 1, wherein the step of performing the functional processing on the task object to be processed through the function area comprises:
    receiving a second drag instruction for the task object to be processed in the function area; and
    in response to a drag of the task object to be processed in a first direction by a preset threshold according to the second drag instruction, performing the functional processing on the task object to be processed according to a function type corresponding to the first direction.

10. The method according to claim 1, wherein the step of calling the task management interface according to the task management function instruction comprises:
    arranging the task objects running in background in accordance with a use frequency in response to the task management function instruction; and
    placing M task objects having the highest use frequency in the M areas to form the chain of task objects, and calling the task management interface to display the M areas.

11. A terminal, comprising:
    a processor, a receiver, a display and a memory that stores instructions executable by the processor, wherein the memory, the receiver and the display rely on the processor to implement operations through a communication bus, when the executable instructions are executed by the processor, the data processing method according to claim 1 is executed.

12. A non-volatile computer-readable storage medium, wherein the computer-readable storage medium stores executable instructions, when the executable instructions are executed by at least one processor, the data processing method according to claim 1 is executed.

13. A terminal, comprising:
    a setting unit, configured to set a task object area;
    a reception unit, configured to receive a task management function instruction;
    a display unit, configured to call a task management interface according to the task management function instruction, wherein the task management interface comprises the task object area comprised of a chain of task objects and a function area;
    a determination unit, configured to determine a task object to be processed in the task object area; and
    a processing unit, configured to perform functional processing on the task object to be processed through the function area,
    wherein the setting unit is configured to set the task object area before receiving the task management function instruction, and to divide an entire display screen of the terminal into N point areas on basis of two-dimensional coordinates;
    the reception unit is further configured to receive a connection instruction for all the N point areas; and
    the setting unit is further configured to connect arbitrary consecutive M areas in the N point areas into a chain area according to the connection instruction, wherein the chain area is an area where the task object is placed, M is an integer greater than or equal to 2 and less than or equal to N and the M areas are a subset of the N point areas, and to construct or reconstruct the task object area according to a connection order received from the connection instruction.

14. The terminal according to claim 13, wherein the task management interface further comprises: a representation area, wherein
    the display unit is further configured to display a first representation corresponding to the task object to be processed through the representation area after the task object to be processed is determined in the task object area.

* * * * *